(12) United States Patent
Ichikawa et al.

(10) Patent No.: US 9,223,604 B2
(45) Date of Patent: Dec. 29, 2015

(54) CONTROL METHOD OF VIRTUAL MACHINE AND VIRTUAL MACHINE SYSTEM

(75) Inventors: Yujiro Ichikawa, Tokyo (JP); Yoshifumi Takamoto, Tokyo (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 14/358,183

(22) PCT Filed: Dec. 8, 2011

(86) PCT No.: PCT/JP2011/078385
§ 371 (c)(1),
(2), (4) Date: May 14, 2014

(87) PCT Pub. No.: WO2013/084332
PCT Pub. Date: Jun. 13, 2013

(65) Prior Publication Data
US 2014/0317625 A1    Oct. 23, 2014

(51) Int. Cl.
G06F 9/455    (2006.01)
G06F 9/50    (2006.01)
G06F 9/48    (2006.01)

(52) U.S. Cl.
CPC ........ *G06F 9/45533* (2013.01); *G06F 9/45558* (2013.01); *G06F 9/4856* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2007/0266383 A1* | 11/2007 | White | G06F 9/4856 718/1 |
| 2009/0222560 A1* | 9/2009 | Gopisetty | G06F 8/60 709/226 |
| 2011/0099403 A1 | 4/2011 | Miyata et al. | |
| 2011/0161483 A1 | 6/2011 | Takemura | |
| 2011/0161491 A1* | 6/2011 | Sekiguchi | G06F 9/5077 709/224 |
| 2012/0042311 A1* | 2/2012 | Biran | G06F 9/45558 718/1 |
| 2012/0054409 A1* | 3/2012 | Block | G06F 11/1484 711/6 |
| 2012/0137285 A1* | 5/2012 | Glikson | G06F 9/5077 718/1 |

FOREIGN PATENT DOCUMENTS

| | | |
|---|---|---|
| JP | 2008-217302 A | 9/2008 |
| JP | 2011-090594 A | 5/2011 |
| JP | 2011-232916 A | 11/2011 |
| WO | 2010/024027 A1 | 3/2010 |

* cited by examiner

Primary Examiner — Brian W Wathen
(74) Attorney, Agent, or Firm — Volpe and Koenig, P.C.

(57) ABSTRACT

A method of controlling a virtual machine, including: detecting a predetermined trigger by a management server; acquiring a relationship between a virtualization unit and a virtual machine operated on a physical computer; specifying a virtual machine as a migration target based on preset trigger definition information; determining a physical computer of a migration destination based on a preset first control pattern to generate a first plan to migrate the virtual machine as the migration destination; transforming the first control pattern to a second control pattern; generating a second plan to migrate the virtual machine as the migration destination; performing arithmetic an evaluation value of the first plan and an evaluation value of the second plan; selecting one of the evaluation values meeting a predetermined condition as an execution plan; and migrating by the management server the virtual machine as the migration target based on the selected execution plan.

16 Claims, 26 Drawing Sheets

Fig. 5

210 TRIGGER DEFINITION INFORMATION

| TRIGGER 500 | MEASURES 501 | |
|---|---|---|
| | TARGET STATE 510 | EVALUATION PATTERN 511 |
| OCCURRENCE OF PREDICTIVE FAILURE | OPERATE VIRTUAL SERVER FOR JOBS THROUGH PHYSICAL SERVER OTHER THAN RELEVANT PHYSICAL SERVER | TIME (MINIMIZATION) |
| THRESHOLD CROSSING OF RESOURCE USAGE RATE OF PHYSICAL SERVER | SET RESOURCE USAGE RATE OF RELEVANT SERVER TO THRESHOLD OR LESS | TIME (MINIMIZATION) 5011 |
| PROVIDING MAINTENANCE FOR CHASSIS | OPERATE VIRTUAL SERVER FOR JOBS THROUGH PHYSICAL SERVER OTHER THAN RELEVANT PHYSICAL SERVER | NUMBER OF CONFIGURATION CHANGES (MINIMIZATION) 5012 |
| SAVING POWER ON WEEKENDS | — | AVERAGE POWER CONSUMPTION OF SERVER (MINIMIZATION) 5013 |

600 DETAILED INFORMATION OF TARGET STATE

| VM NAME | SERVER VIRTUALIZATION UNIT NAME |
|---|---|
| VM-1 | Don't Care |
| VM-2 | OTHER THAN HOST-B |
| VM-3 | OTHER THAN HOST-B |
| VM-4 | Don't Care |
| VM-5 | OTHER THAN HOST-B |

213 CONTROL PATTERN TRANSFORMATION DEFINITION INFORMATION

901

| TRANSFORMATION SOURCE INFORMATION 910 | | TRANSFORMATION DESTINATION INFORMATION 920 | |
|---|---|---|---|
| CONTROL PATTERN NAME | ARGUMENT 911 | CONTROL PATTERN NAME | ARGUMENT 921 |
| MIGRATION OF VM FOR JOBS | • VM NAME<br>• SERVER VIRTUALIZATION UNIT NAME OF MIGRATION SOURCE<br>• SERVER VIRTUALIZATION UNIT NAME OF MIGRATION DESTINATION | MIGRATION OF INTERMEDIATE VM | • PARENT VM NAME OF VM NAME FOR JOBS<br>• PARENT SERVER VIRTUALIZATION UNIT NAME OF SERVER VIRTUALIZATION UNIT OF MIGRATION SOURCE<br>• SERVER VIRTUALIZATION UNIT NAME OF MIGRATION DESTINATION |

211' EXECUTION PLAN INFORMATION
(AFTER TRANSFORMATION)

| 1100 CONTROL PATTERN | 1101 ARGUMENT | 1102 CONTROL DESTINATION |
|---|---|---|
| MIGRATION OF INTERMEDIATE VM | MIGRATION TARGET: VM-4 MIGRATION DESTINATION: HOST-A | HOST-B |
| MIGRATION OF VM FOR JOBS | MIGRATION TARGET: VM-5 MIGRATION DESTINATION: HOST-A | HOST-B |

*Fig. 11*

600A DETAILED INFORMATION OF TARGET STATE

| 610 VM NAME | 1211 RESOURCE USAGE RATE THRESHOLD | |
|---|---|---|
| | 1220 CPU | 1221 MEMORY |
| VM-1 | Don't Care | Don't Care |
| VM-2 | Don't Care | Don't Care |
| VM-3 | Don't Care | Don't Care |
| VM-4 | XB<70 | YB<80 |
| VM-5 | Don't Care | Don't Care |

*Fig. 12*

212 CONTROL PATTERN DEFINITION INFORMATION

| CONTROL PATTERN NAME | ARGUMENT | EXECUTION TIME |
|---|---|---|
| MIGRATION OF VM FOR JOBS | • VM NAME OF MIGRATION TARGET<br>• SERVER VIRTUALIZATION UNIT NAME OF MIGRATION SOURCE<br>• SERVER VIRTUALIZATION UNIT NAME OF MIGRATION DESTINATION | 2 |
| MIGRATION OF INTERMEDIATE VM | • VM NAME OF MIGRATION TARGET<br>• SERVER VIRTUALIZATION UNIT NAME OF MIGRATION SOURCE<br>• SERVER VIRTUALIZATION UNIT NAME OF MIGRATION DESTINATION | 3 |
| CHANGE IN RESOURCE ALLOCATION FOR INTERMEDIATE VM | • VM NAME OF CHANGE TARGET<br>• NEW RESOURCE ALLOCATION AMOUNT (NUMBER OF CPU CORES)<br>• NEW RESOURCE ALLOCATION AMOUNT (MEMORY CAPACITY) | 0 |

710 CONTROL PATTERN NAME
711 ARGUMENT
712 EXECUTION TIME

Fig. 13

213 CONTROL PATTERN TRANSFORMATION DEFINITION INFORMATION

901

| TRANSFORMATION SOURCE INFORMATION 900 | | TRANSFORMATION DESTINATION INFORMATION | |
|---|---|---|---|
| CONTROL PATTERN NAME 910 | ・ARGUMENT 911 | CONTROL PATTERN NAME 920 | ARGUMENT 921 |
| MIGRATION OF VM FOR JOBS | ・VM NAME<br>・SERVER VIRTUALIZATION UNIT NAME OF MIGRATION SOURCE<br>・SERVER VIRTUALIZATION UNIT NAME OF MIGRATION DESTINATION | MIGRATION OF INTERMEDIATE VM | ・PARENT VM NAME OF VM NAME FOR JOBS<br>・PARENT SERVER VIRTUALIZATION UNIT NAME OF SERVER VIRTUALIZATION UNIT OF MIGRATION SOURCE<br>・SERVER VIRTUALIZATION UNIT NAME OF MIGRATION DESTINATION |
| MIGRATION OF INTERMEDIATE VM | ・PARENT VM NAME OF VM NAME FOR JOBS<br>・PARENT SERVER VIRTUALIZATION UNIT NAME OF SERVER VIRTUALIZATION UNIT OF MIGRATION SOURCE<br>・SERVER VIRTUALIZATION UNIT NAME OF MIGRATION DESTINATION | CHANGE IN RESOURCE ALLOCATION FOR INTERMEDIATE VM | ・VM NAME OF INTERMEDIATE VM<br>・SERVER VIRTUALIZATION UNIT NAME OF SERVER VIRTUALIZATION UNIT OPERATED BY INTERMEDIATE VM<br>・CPU RESOURCE AMOUNT POSSESSED BY INTERMEDIATE VM<br>・MEMORY CAPACITY POSSESSED BY INTERMEDIATE VM |

*Fig. 14*

212 CONTROL PATTERN DEFINITION INFORMATION

| CONTROL PATTERN NAME | ARGUMENT | NUMBER OF CONFIGURATION CHANGE |
|---|---|---|
| MIGRATION OF VM FOR JOBS | • VM NAME OF MIGRATION TARGET<br>• SERVER VIRTUALIZATION UNIT NAME OF MIGRATION SOURCE<br>• SERVER VIRTUALIZATION UNIT NAME OF MIGRATION DESTINATION | 1 |
| MIGRATION OF INTERMEDIATE VM | • VM NAME OF MIGRATION TARGET<br>• SERVER VIRTUALIZATION UNIT NAME OF MIGRATION SOURCE<br>• SERVER VIRTUALIZATION UNIT NAME OF MIGRATION DESTINATION | 1 |
| CHANGE IN RESOURCE ALLOCATION FOR INTERMEDIATE VM | • VM NAME OF CHANGE TARGET<br>• NEW RESOURCE ALLOCATION AMOUNT (NUMBER OF CPU CORES)<br>• NEW RESOURCE ALLOCATION AMOUNT (MEMORY CAPACITY) | 0 |

710 = CONTROL PATTERN NAME; 711 = ARGUMENT; 713 = NUMBER OF CONFIGURATION CHANGE

Fig. 17

CONTROL METHOD OF VIRTUAL MACHINE AND VIRTUAL MACHINE SYSTEM

BACKGROUND

The present invention relates to a virtual machine system, and more particularly to a technique for presetting a pattern for dynamically changing a virtual machine to perform a change pattern by a predetermined trigger in a server virtual environment.

A server virtualization technology has been widely used for allocating a resource of a physical computer to a plurality of virtual servers (hereinafter referred to as a virtual computer) and logical partitions (hereinafter referred to as an LPAR) in such a way that one physical computer provides a plurality of virtual computers. It is possible to run a virtual computer with flexibility for a dynamic change in a resource to be allocated, hot migration for migrating a virtual computer being operated to the other physical computer, and the like (see Japanese Patent Application Laid-open No. 2008-217302, for example).

In a computer system applying the server virtual technique (hereinafter referred to as a server virtual environment), it is possible to combine a dynamical change in a resource, hot migration and the like for improving availability of a virtual computer, and improving load-leveling and scalability of a physical computer. For such a dynamic change of a virtual computer, an administrator of a computer system or the like presets, based on an operating policy and the like, a combination of a change in a resource, hot migration and the like, a trigger for execution and the like, as control patterns. Triggers for execution include occurrence of a failure, the value of usage or a remaining amount of resources and a significant increase in a load of a physical computer.

SUMMARY

However, a preset control pattern may not be effective depending on a situation where the preset control pattern is executed. For example, assuming that a control pattern is set to migration of a virtual computer, and a trigger for execution is set to detection of a predictive failure in a physical computer having the virtual computer operated, a large number of virtual computers as a target of the control pattern causes an increase in a time required for migration of all virtual computers, therefore posing a problem that it is impossible to migrate the virtual computers immediately to the other physical computer. In this case, an execution time is likely to be shortened by migrating an LPAR in a server virtualization unit (a hypervisor or a VMM) rather than migrating respective virtual computers individually.

In light of the above-described problem, an object of the present invention is to immediately and appropriately perform migration of a virtual computer when making a dynamic change in a server virtual environment.

A representative aspect of this invention is as follows. A method of controlling a virtual machine, including a physical computer having a virtualization unit providing one or more virtual machines and a management server managing a plurality of the physical computers with a processor and memory so that the management server controls the virtual machine and the virtualization unit, comprising: a first step of detecting a predetermined trigger by the management server; a second step of acquiring by the management server a relationship between a virtualization unit and a virtual machine operated on the physical computer; a third step of specifying by the management server a virtual machine as a migration target based on preset trigger definition information; a fourth step of determining by the management server a physical computer of a migration destination based on a preset first control pattern to generate a first plan to migrate the virtual machine as the migration target to the physical computer of the migration destination; a fifth step of transforming by the management server the first control pattern to a second control pattern based on preset transformation definition information; a sixth step of generating by the management server a second plan to migrate the virtual machine as the migration target to the physical computer of the migration destination based on the transformed second control pattern; a seventh step of performing arithmetic by the management server for an evaluation value of the first plan and an evaluation value of the second plan, respectively; an eighth step of comparing by the management server the evaluation value of the first plan to the evaluation value of the second plan to select one of the evaluation values meeting a predetermined condition as an execution plan; and a ninth step of migrating by the management server the virtual machine as the migration target based on the selected execution plan.

According to the present invention, it is possible to select a trigger detected by a management server, and a control pattern suitable for a target state corresponding to the type of a trigger based on dynamic information of a virtual machine system (configuration information, performance information, resource allocation information and the like), for making a configuration change of a virtual computer.

BRIEF DESCRIPTION OF THE DRAWINGS

FIG. 5 shows the first embodiment of this invention, and is an example of the trigger definition information used by the execution plan generation unit.

FIG. 6 shows the first embodiment of this invention, and is a specific example to indicate the target state in a case where occurrence of a predictive failure is regarded as the trigger.

FIG. 9 shows the first embodiment of this invention, and is an example of the control pattern transformation definition information.

FIG. 11 shows the first embodiment of this invention, and is an example of the execution plan information after transformation.

FIG. 12 shows a second embodiment of this invention, and is an example of detailed information of a target state.

FIG. 13 shows the second embodiment of this invention, and is an example of the control pattern definition information.

FIG. 14 shows the second embodiment of this invention, and is an example of the control pattern transformation definition information.

FIG. 17 shows a fourth embodiment of this invention, and is an example of the control pattern definition information.

DETAILED DESCRIPTION OF THE PREFERRED EMBODIMENTS

Hereinafter, description will be given for an embodiment of the present invention with reference to the accompanying drawings.

First Embodiment

Figure 1A:
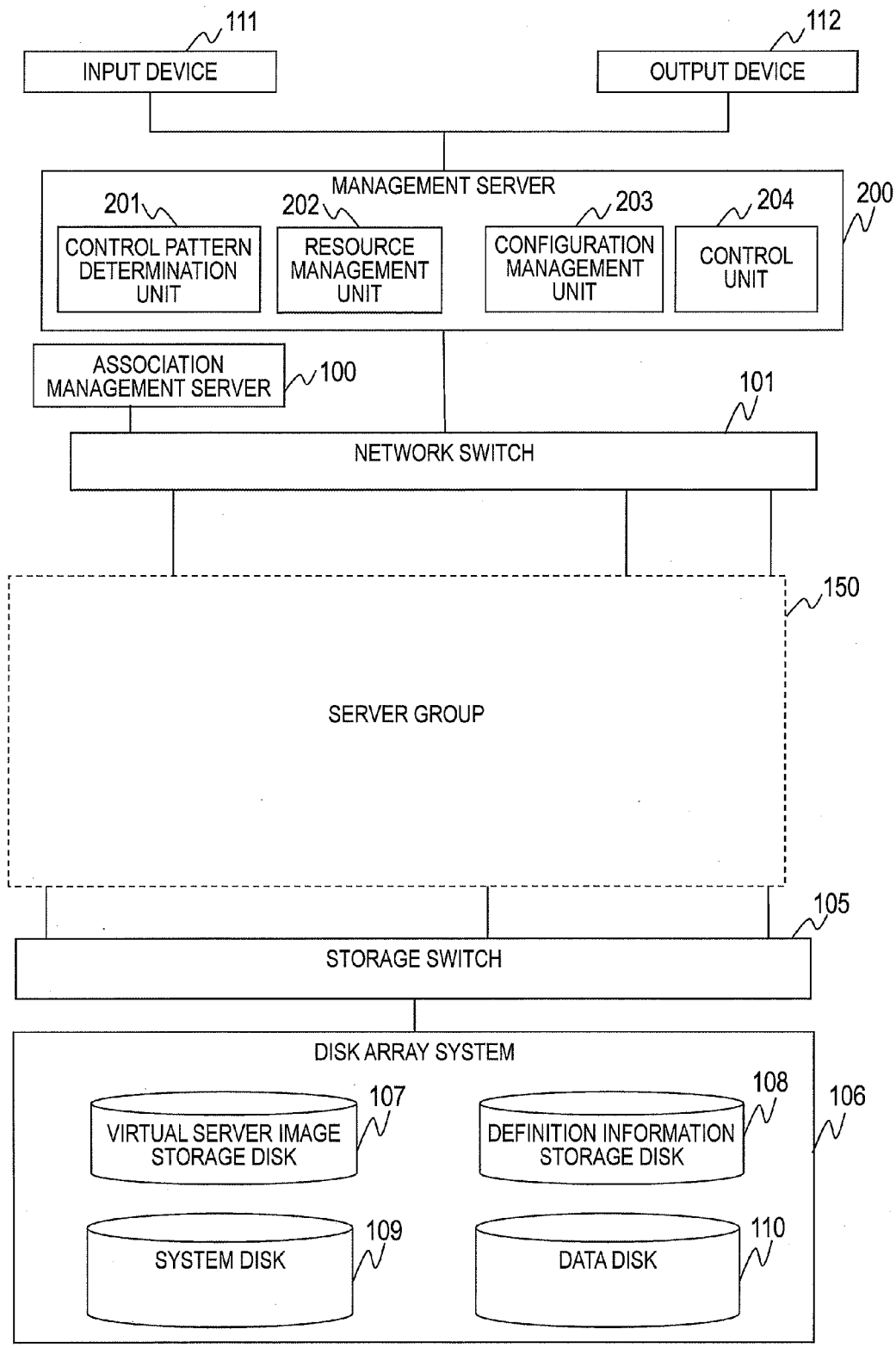
FIG. 1A shows a first embodiment of this invention, and is a block diagram showing an example of a computer system.
Figure 1B:
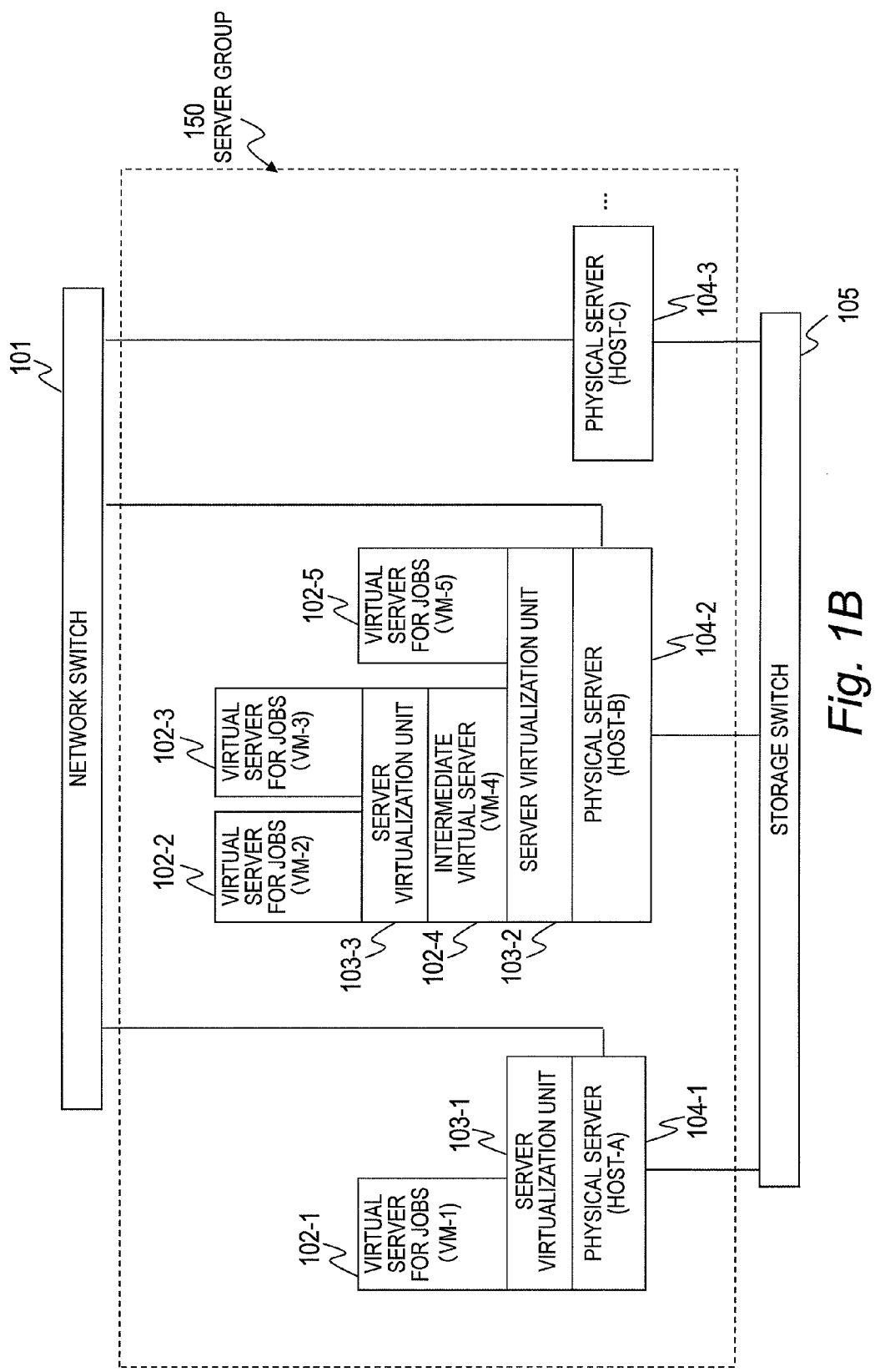
FIG. 1B shows the first embodiment of this invention, and is a block diagram showing a detailed configuration of a server group of FIG. 1A.

FIG. 1A and FIG. 1B show a configuration of a computer system applying the present invention, where FIG. 1B is a block diagram showing a detailed configuration of a server group 150 of FIG. 1A. This computer system includes: a management server 200; one or more physical servers 104-1 to 104-3 constituting the server group 150; one or more network switches 101; one or more storage switches 105; a disk array system 106; one or more association management servers 100; and an input device 111 and an output device 112 coupled to the management server 200. Hereinafter, the physical servers 104-1 to 104-3 are collectively represented by a reference numeral 104.

The management server 200 is a computer running by program control, and is provided with an NIC (Network Interface Card) coupled to the network switch 101. The management server 200 is coupled to the physical server 104, the disk array system 106 and the association management server 100, via the network switch 101.

The management server 200 allows a control pattern determination unit 201, a resource management unit 202, a configuration management unit 203, and a control unit 204 to function. Further, the management server 200 has multiple pieces of information for allowing each unit to function, as will be described below after description about FIG. 2.

In FIG. 1B, the physical server 104 is a computer running by program control, and provided with an NIC coupling to the network switch 101 and an HBA (Host Bus Adapter) coupling to the storage switch 105. The physical server 104 is coupled to the other physical server 104, the management server 200, the disk array system 106 and the association management server 100, via the network switch 101.

The physical server 104 is coupled to the disk array system 106 via the storage switch 105. On the physical server 104, server virtualization units 103-1 to 103-2 and virtual servers 102-1 to 102-5 may be operated. Moreover, on the virtual server 102-2, yet another server virtualization unit 103-3 may be operated. The server virtualization units 103-1 to 103-3 are comprised of, for example, a hypervisor or a VMM (Virtual Machine Monitor). Hereinafter, the virtual servers are collectively represented by a reference numeral 102, and the server virtualization units are collectively represented by a reference numeral 103.

The network switch 101 means one or more network apparatuses. The network apparatus specifically includes a network switch, a router, a load balancer, a firewall and the like. One or more network switches 101 comprise a network 1010 below after description about FIG. 2.

The disk array system 106 is provided with an FC (Fiber Channel) and a LAN interface, and allows access from the management server 200, the physical server 104 and the association management server 100. The disk array system 106 is a storage system including one or more disks. The disk array system 106 includes a virtual server image storage disk 107, a definition information storage disk 108, a system disk 109 and a data disk 110, as disks required for execution of the physical server (physical computer) 104, the server virtualization unit 103, and the virtual server (virtual machine) 102. The virtual server image storage disk 107 has a disk volume with a disk image constituting the virtual server 102.

The definition information storage disk 108 has a disk volume with an OS (Operating System) installed in the virtual server 102 and metadata having description of a content of a virtual device (a CPU, memory and the like) allocated to the virtual server 102. The system disk 109 has a disk volume with the OS installed in the physical server 104. The data disk 110 has a disk volume with data used for execution of a job (or application) by the virtual server 102 and the physical server 104.

The association management server 100 links information for allowing the management server 200 to couple to each unit of a computer system. The association management server 100 has a function of performing acquisition of information and making a state change and a configuration change for each unit of the computer system. Additionally, the association management server 100 is provided with an external interface (an API, a CLI or the like), and the management server 200 can execute a function of the association management server 100 via a network.

The input device 111 interfaces an administrator to each unit of the computer system such as the management server 200 for manipulation. The input device is specifically a keyboard, a mouse, a touch panel, a client computer device allowing them to be coupled, or the like.

The output device 112 is used for manipulating by an administrator with use of the input device 111 and confirming a response content from each unit with respect to input. The output device 112 specifically refers to a display or a client computer coupling to the display.

Figure 2:
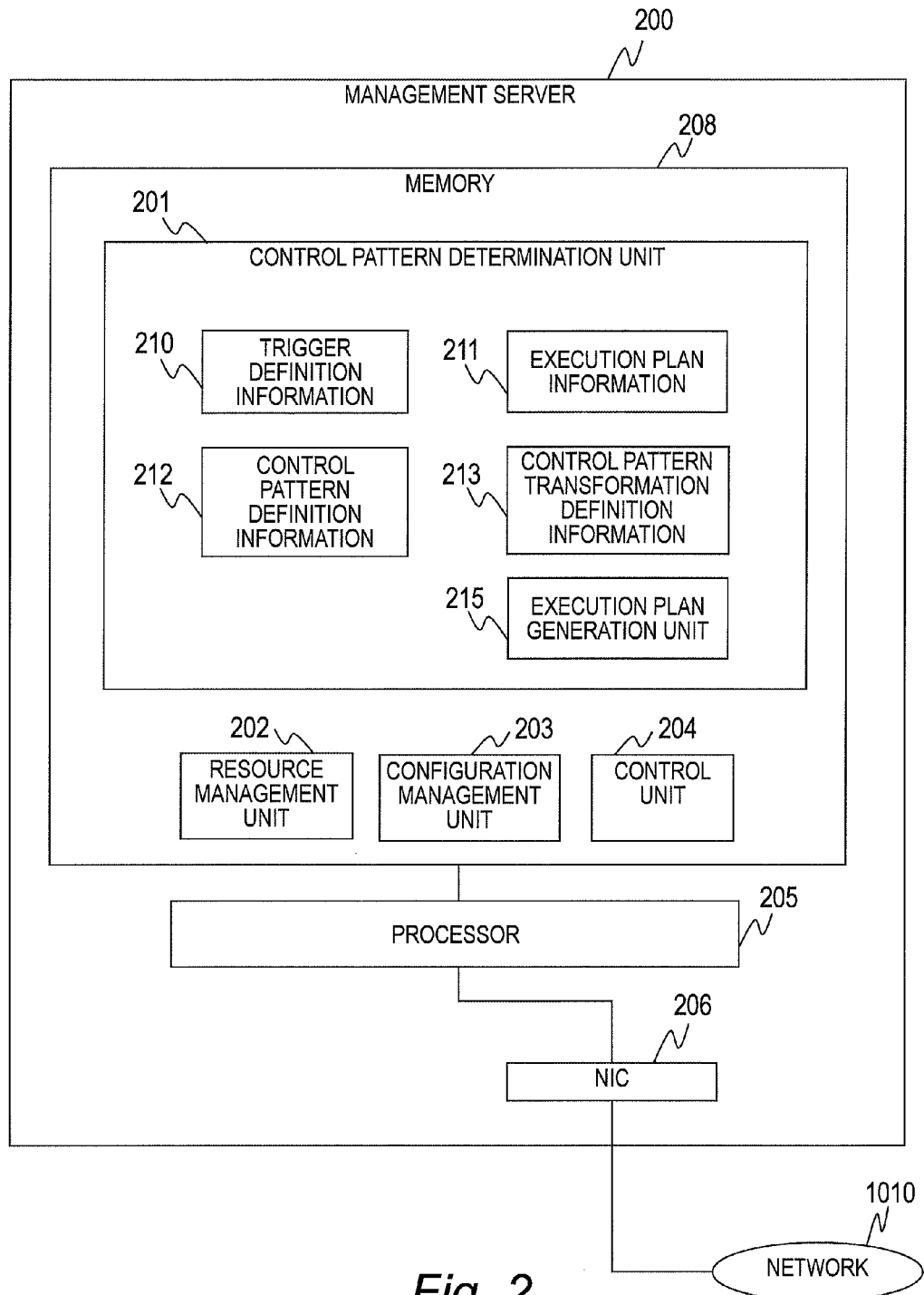
FIG. 2 shows the first embodiment of this invention, and is a block diagram showing a configuration of the management server.

FIG. 2 is a block diagram showing a configuration of the management server 200. The management server 200 includes the control pattern determination unit 201, the resource management unit 202, the configuration management unit 203 and the control unit 204. Further, the control pattern determination unit 201 includes trigger definition information 210, execution plan information 211, control pattern definition information 212, control pattern transformation definition information 213 and an execution plan generation unit 215. The details of each functional part will be discussed below after the description of FIG. 5. Note that, in the present embodiment, the control pattern determination unit 201, the resource management unit 202, the configuration management unit 203 and the control unit 204 are explained as a program to be executed by a CPU (processor) 205, however, may be implemented by hardware or firmware loaded into the management server 200 or a combination thereof. Furthermore, the control pattern determination unit 201, the resource management unit 202, the configuration management unit 203 and the control unit 204 are stored in not shown auxiliary storage (or the disk array system 106) included in the management server 200, and loaded into memory 208 when executed, thereafter being executed by the CPU 205.

The control pattern determination unit 201 acquires a request from the input device 111, and external information from the physical server 104, the server virtualization unit 103, the virtual server 102, the network switch 101, the storage switch 105, the disk array system 106 and the association management server 100. The external information includes information indicating a failure or a predictive failure, performance information, configuration information, and state information. Further, the control pattern determination unit 201 acquires internal information from each unit of the association management server 100. The internal information includes information indicating a failure or a predictive failure, information indicating a change in a configuration or a state, and information on scheduled control input in advance by an administrator. Here, an approach for detecting a predictive failure is not described since a publicly known or well-known technique may be employed.

The control pattern determination unit 201 then creates one or more instructions for controlling each unit of the computer system by the control unit 204 with the above-described external information and internal information as input. This instruction is, for example, an instruction to request the server virtualization unit 103 to migrate the virtual server 102 being operated to the other server virtualization unit 103. The control pattern determination unit 201 refers the above-described input information and information included in the resource management unit 202 and the configuration management unit 203 in order to generate the instruction.

The resource management unit 202 collects and holds resource allocation information and load information (a CPU usage rate, memory usage, and the like) from the physical server 104, the server virtualization unit 103, the virtual server 102, the disk array system 106 and the like. Moreover, the resource management unit 202 performs arithmetic for a change in the collected load information and information indicating a predictive failure of the computer system for sending to the control pattern determination unit 201.

The configuration management unit 203 collects and holds configuration information (a host name, an IP address, a virtual server name, a logical partition configuration, a virtual machine configuration and the like) of each of the physical server 104 and the association management server 100. Additionally, the configuration management unit 203 sends information indicating a change in configuration information and a predictive failure of the system to the control pattern determination unit 201.

The control unit 204 sends an instruction to the physical server 104, the server virtualization unit 103, the virtual server 102, the disk array system 106 or the like to receive a response therefrom in order to execute a command to execute a control pattern determined at the control pattern determination unit 201 and collection of information by the resource management unit 202 and the configuration management unit 203.

The management server 200 is provided with an NIC 206 for coupling to the network 1010. The management server 200 is coupled to the physical server 104, the disk array system 106 and the association management server 100, via the network 1010. The management server 200 may include a plurality of NICs.

The CPU 205 runs according to a program of each functional part, thereby running as a functional part realizing a predetermined function. For example, the CPU 205 performs processing according to a configuration management program, thereby functioning as the configuration management unit 203. Much the same is true on the other program. Additionally, the CPU 205 also runs as a functional part realizing each of a plurality of processes executed by each program. The computer and the computer system are a device and a system, respectively, including these functional parts.

Information on a program, a table and the like realizing each function may be stored in auxiliary storage (not shown) of the management server 200, the disk array system 106, a storage device such as non-volatile semiconductor memory, a hard disk drive and an SSD (Solid State Drive), or a computer readable non-transitory data storage medium such as an IC card, an SD card and a DVD.

Figure 3:
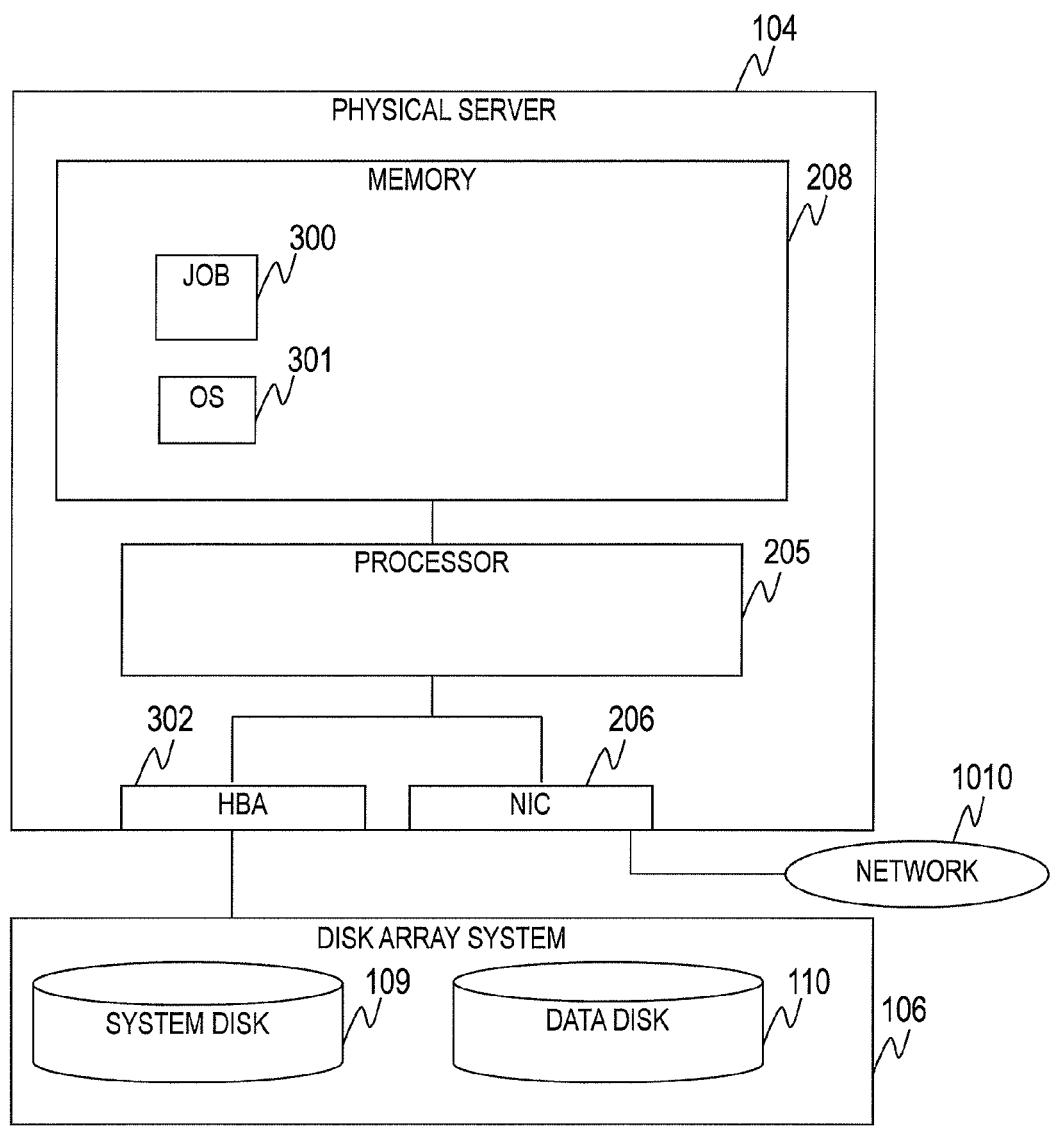
FIG. 3 shows the first embodiment of this invention, and is a block diagram showing an example of a configuration of the physical server.

FIG. 3 is a block diagram showing an example of a configuration of the physical server 104. The physical server 104 includes the memory 208 and the CPU 205. The memory 208 holds a program for running an OS 301 and performing processing required for jobs (a software program and the like) 300.

The physical server 104 is provided with the NIC 206 for coupling to the network 1010. The physical server 104 is coupled to the management server 200, the association management server 100 and the other physical server 104, via the network 1010. The physical server 104 is provided with an HBA 302 for coupling to the disk array system 106. The physical server 104 may include a plurality of NICs and HBAs.

Figure 4:
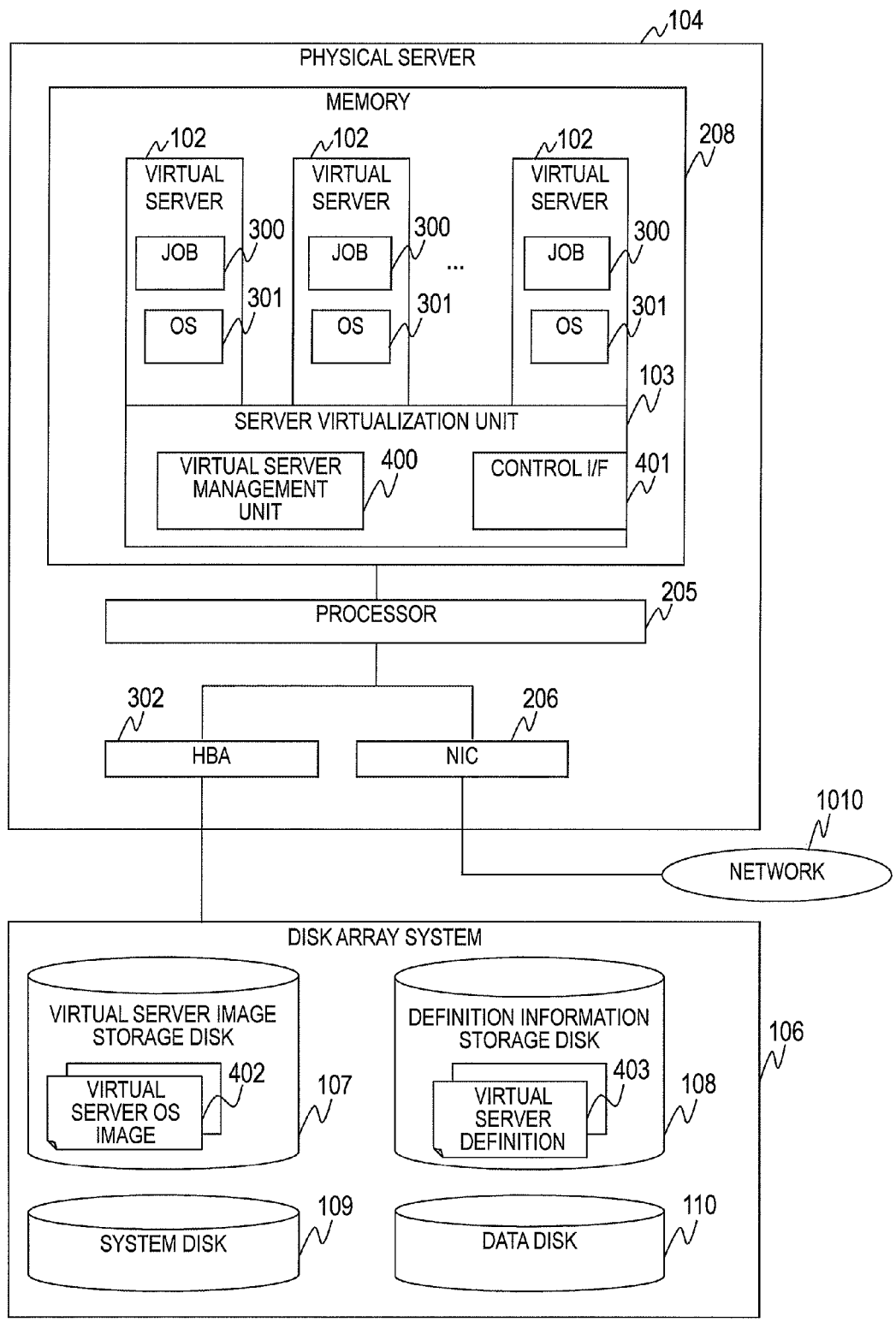
FIG. 4 shows the first embodiment of this invention, and is a block diagram showing another configuration of the physical server.

FIG. 4 is a block diagram showing another configuration of the physical server 104. The physical server 104 includes the memory 208 and the CPU 205. The memory 208 holds a program for running the server virtualization unit 103 and the virtual server 102.

The physical server 104 is provided with the NIC 206 for coupling to the network 1010. The physical server 104 is coupled to the management server 200, the association management server 100 and the other physical server 104, via the network 1010. The physical server 104 is provided with the HBA 302 for coupling to the disk array system 106. The physical server 104 may include a plurality of NICs and HBAs.

The server virtualization unit 103 is a program for running the virtual server 102 (VM (Virtual Machine)) and an LPAR (Logical Partition). The server virtualization unit 103 includes a virtual server management unit 400 and a control I/F (Interface) 401. The virtual server management unit 400 collects, holds and updates load information (a CPU usage rate, memory usage and the like), configuration information (OS types, an allocated virtual device and the like) and state information (a power source, effectiveness/ineffectiveness of a device, presence/absence of a failure of a device and the like). The control I/F 401 provides the virtual server management unit 400 with access means to the outside (the management server 200, the association management server 100, the other physical server 104 and the like).

On the server virtualization unit 103, one or more virtual servers 102 run. The virtual server 102 is a virtual server device running with a computer resource of the physical server 104 allocated by the server virtualization unit 103. On the virtual server 102, the OS 301 runs, the processing required for jobs (a software program, and the like) 300 is performed, or another server virtualization unit 103 runs. Hereinafter, the virtual server 102 performing the processing required for jobs 300 is referred to as the virtual server for jobs 102, and the virtual server 102 running another server virtualization unit 103 is referred as an intermediate virtual server 102.

FIG. 5 shows an example of the trigger definition information 210 used by the execution plan generation unit 215 of the control pattern determination unit 201. As the trigger definition information 210, the execution plan generation unit 215 defines information for creating the execution plan information 211 by the execution plan generation unit 215 appropriate for information as a trigger of execution of the control pattern determination unit 201. The present embodiment provides occurrence of a predictive failure as an example of trigger information. In a case where a predictive failure occurs in a certain physical server 104, this physical server 104 thereafter stops, so that the server virtualization unit 103 operated on the physical server 104, and the virtual server 102 and a job application 300 operated on the virtual server 102 possibly stop.

The management server 200 must migrate the virtual server 102 onto another physical server 104 in order to avoid unintended stoppage of the job application 300 as much as possible. Moreover, in order to migrate more virtual servers 102, the management server 200 must control the computer system as fast as possible.

In the trigger definition information 210, a trigger (occurrence of a predictive failure), a target state with respect to the trigger (a virtual server is operated on the other physical server), and an evaluation pattern for control (a shorter execution time is better), as described above, are defined. The other trigger information will be described in detail after the description of the second embodiment.

FIG. 5 shows a trigger 500 including the types of trigger information accepted by the management server 200 as a trigger of a configuration change of the virtual server 102. The trigger 500 determines a content of measures 501 used as information in order for the execution plan generation unit 215 to create the appropriate execution plan information 211 as compared to trigger information sent to the execution plan generation unit 215 by the input device 111 manipulated by an administrator, the association management server 100, the physical server 104, the virtual server 102, and the server virtualization unit 103. The measures 501 include a target state 510 of a control pattern and an evaluation pattern 511, with respect to the trigger 500.

The target state 510 solves a problem and a request with respect to the trigger 500, and for example, in a case where the trigger 500 is a predictive failure, such the problem and the request are to avoid stoppage of the virtual server 102. A solution of the request is to migrate the virtual server 102 to the other physical server 104.

The target state 510 should include information capable of indicating a target value among system configuration information, a resource allocation situation, performance estimation and the like held by the management server 200 in order for the execution plan generation unit 215 to generate the execution plan information 211.

As an example of the target state 510, the target state 510 is determined as a conditional expression concerning a configuration and performance such that "set a parent physical server 104 of the virtual server 102 other than HOST-A of FIG. 1-B", "allocate memory of 2 GB to the virtual server 102" and "set a resource usage rate for all physical servers 104 to 80% or less".

Such the value is compared to the system configuration information, the resource allocation situation and the performance estimation in the case of executing the execution plan information 211 in order for the control pattern determination unit 201 to decide whether or not the generated execution plan information 211 meets the above-described target state 510.

Description will be given for a specific example to indicate the target state 510 with respect to the trigger 500 of the present embodiment in FIG. 6. The evaluation pattern 511 is the type of an index provided for updating the execution plan information 211 by the execution plan generation unit 215 and evaluating whether or not the updated execution plan information 211' is better than the execution plan information 211 prior to update. For example, in the case of providing the evaluation pattern 511 as minimization of the time, a short execution time of the execution plan information 211 is highly evaluated. Further, in the case of providing the evaluation pattern 511 as minimization of the number of configuration changes, less frequency of the configuration change (for example, migration of the virtual server 102 to the other virtual server is counted as one configuration change) by control of the execution plan information 211 is highly evaluated.

Additionally, in FIG. 5, a computer resource usage rate of a physical server exceeding a threshold, maintenance of a chassis, saving power on weekends and the like are set as the trigger 500, in addition to the occurrence of a predictive failure as described above.

FIG. 6 is a specific example to indicate the target state 510 in a case where occurrence of a predictive failure is regarded as the trigger 500. Here, as shown in FIG. 1B, the physical server 104-2 having a predictive failure occurred is regarded as HOST-B, and a first server virtualization unit 103-2 is operated on HOST-B, while on the first server virtualization unit 103-2, a first intermediate virtual server 102-4 (VM-4) and a second virtual server for jobs 102-5 (VM-5) are operated. A second server virtualization unit 103-3 is further operated on the first virtual server 102-4, while a third virtual server for jobs 102-2 (VM-2) and a fourth virtual server for jobs 102-3 (VM-3) are operated on the second server virtualization unit 103-3.

Detailed information of a target state 600 includes values of specific system configuration, state, resource and the like to meet the target state 510. In the present embodiment, since the target state 510 is provided as that "operate the virtual server for jobs 102 through a physical server other than a relevant physical server", as the detailed information of a target state 600, the execution plan generation unit 215 sets configuration information indicating that the virtual server for jobs 102 operated on HOST-B is migrated to the server virtualization unit 103 other than HOST-B.

In the present embodiment, in order to indicate such the configuration information, a VM name 610 as an identifier for identifying the virtual server 102, and a server virtualization unit name 611 as an identifier for identifying the server virtualization unit 103 operated by the virtual server 102 are prepared. In the present embodiment, the server virtualization unit having the virtual servers VM-2, VM-3 and VM-5 operated as migration targets is operated on a server other than HOST-B.

Figure 7:
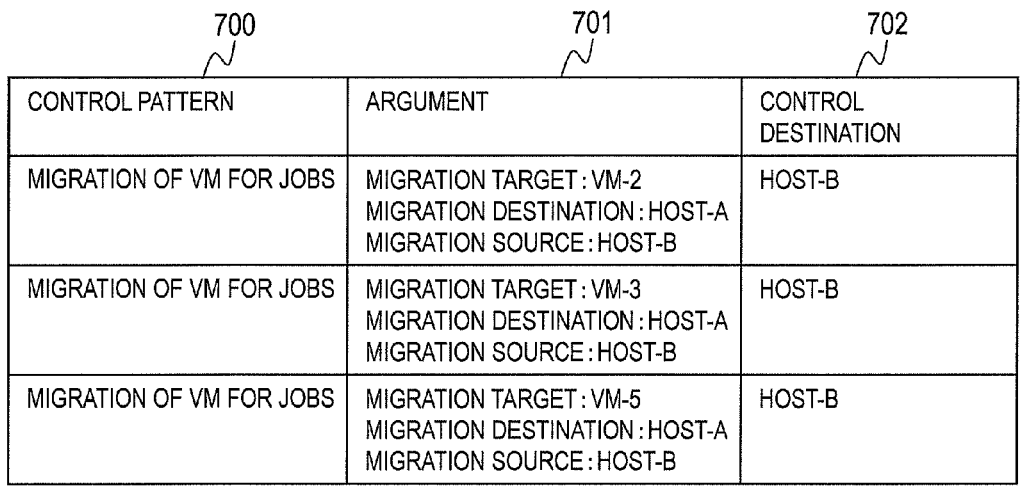
FIG. 7 shows the first embodiment of this invention, and is an example of the first execution plan information.

FIG. 7 shows an example of the first execution plan information 211. The first execution plan information 211 is created immediately after the execution plan generation unit 215 starts processing, and may be updated according to the following processing of the execution plan generation unit 215. The first execution plan information 211 is automatically created by the execution plan generation unit 215 with use of a control pattern defined in the control pattern definition information 212. Alternatively, the pattern set by an administrator for each trigger 500 may be utilized.

The first execution plan information 211 includes, in order for the management server 200 to use the control unit 204 to control the computer system, an instruction sent to the association management server 100, the physical server 104, the virtual server 102 and the server virtualization unit 103.

A control pattern 700 includes an identifier for identifying a control pattern and a name of a command. An argument 701 is an argument indicating a target when executing the control pattern 700, or the like. A control destination 702 is an identifier for identifying a destination to send an instruction. The control pattern determination unit 201 sends a content of one or more pieces of the execution plan information 211 to the control unit 204. Here, the execution plan information 211 is executed in the order entered. In other words, the argument 701 designates the order that performing processing of an entry including "VM-3" follows performing processing of "VM-2", thereafter performing processing of an entry including "VM-5".

Figure 8:
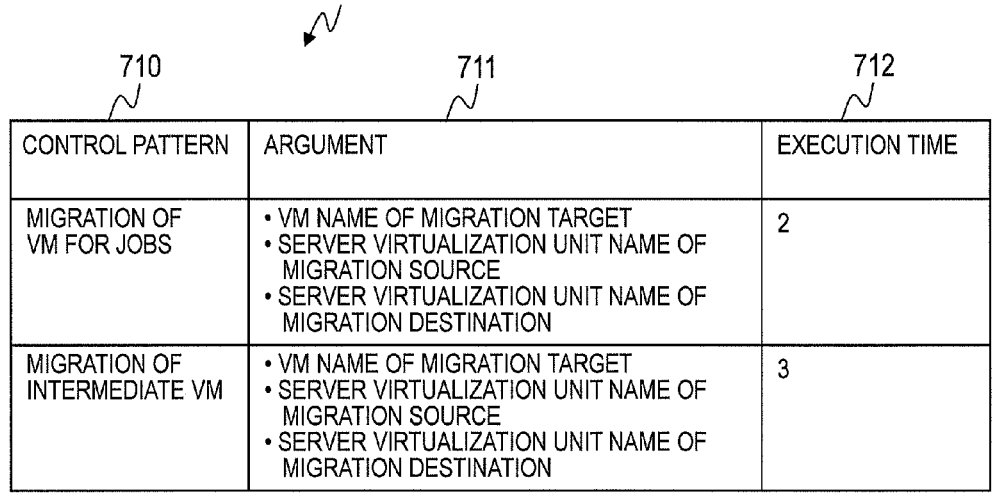
FIG. 8 shows the first embodiment of this invention, and is an example of the control pattern definition information.

FIG. 8 shows an example of the control pattern definition information 212. The control pattern definition information 212 holds information on a target such that the control unit 204 controls the association management server 100, the physical server 104, the virtual server 102 and the server virtualization unit 103. A control pattern 710 includes an identifier for identifying a control pattern and a name of an instruction. An argument 711 is an argument indicating a target when executing the control pattern 710, or the like. Moreover, the control pattern definition information 212 includes information indicating a feature of each control pattern 710. Such information is used in order for the execution plan generation unit 215 to evaluate with an evaluation pattern 511 on whether the execution plan information 211 including one or more control patterns 710 is good or bad. In the present embodiment, an execution time 712 is included as information indicating a feature. The execution time 712 is an evaluation value of a time required for executing the control pattern 710, that is, an index of a time required for making a configuration change of the virtual server 102. A large value of the execution time increases a time required for processing, resulting in low evaluation. A small value of the execution time shortens a time required for processing, resulting in evaluation improved.

FIG. 9 shows an example of the control pattern transformation definition information 213. The control pattern transformation definition information 213 indicates whether or not there is a control pattern transformable to another control pattern from the control pattern definition information 212 already set. For example, in a case where the server virtualization unit 103 is operated on the intermediate virtual server 102 while the virtual server for jobs 102 is further operated on the server virtualization unit 103, as shown in FIG. 1B, migration of the virtual servers for jobs 102-2 and 102-3 (VM-2 and VM-3) can be replaced by migration of a parent intermediate virtual server 102-4 (VM-4).

Each value of the control pattern transformation definition information 213 corresponds to the value of the control pattern definition information 212. Transformation source information 900 includes information on a control pattern of a transformation source, and includes a control pattern name 910 and an argument 911 as sub-columns. The argument 911 is used as input information for creating the value of an argument 912. Transformation destination information 901 includes information on a control pattern of a transformation destination for the transformation source information 900, and includes a control pattern name 920 and an argument 921 as sub-columns. The argument 921 has information defined for creating a specific value of a control target. The specific value is created from the argument 911, configuration information, state information, resource information and the like, as an example.

Figure 10:
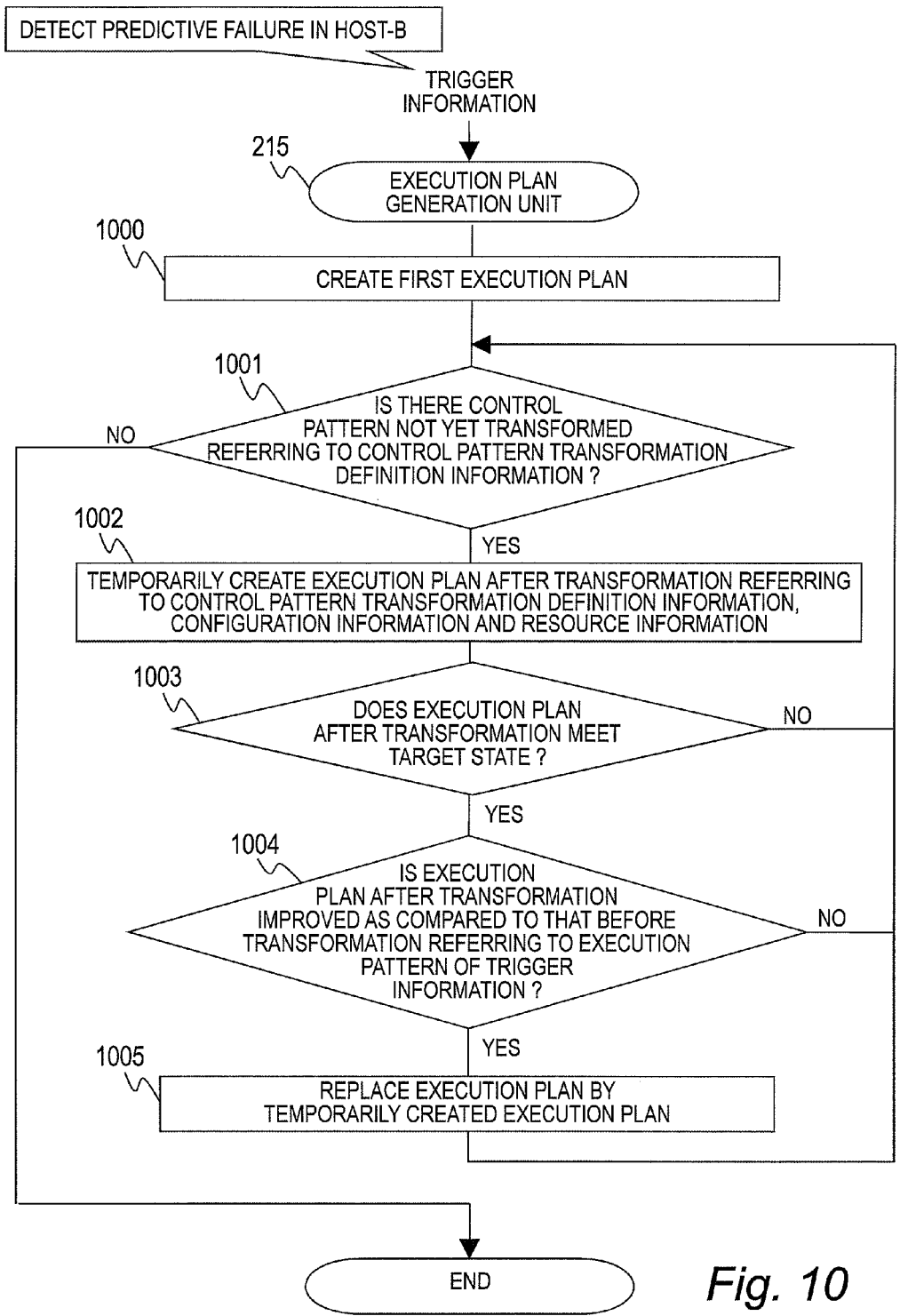
FIG. 10 shows the first embodiment of this invention, and is a flowchart showing an example of processing performed at the execution plan generation unit.

FIG. 10 is a flowchart showing an example of processing performed at the execution plan generation unit 215 in the present embodiment.

The execution plan generation unit 215 is started to generate the execution plan information 211 in order for the control pattern determination unit 201 to control the control unit 204, with trigger information (notification of a predictive failure) sent to the management server 200 from an administrator, the association management server 100, the physical server 104, the virtual server 102 and the server virtualization unit 103 as input.

The execution plan generation unit 215 creates the execution plan information 211 from the received trigger information (for example, notification of a predictive failure), the trigger definition information 210, the control pattern definition information 212, configuration information included in the configuration management unit 203, state information and resource information included in the resource management unit 202 (step 1000).

The execution plan generation unit 215 acquires here a relationship between the server virtualization unit 103 and the virtual server 102 operated on each physical server 104, for all physical servers 104 including the physical server 104 having a predictive failure occurred as the trigger 500. The execution plan generation unit 215 then specifies the virtual server 102 as a migration target and the physical server 104 of a migration destination, from the control pattern 710 and the argument 711 of the control pattern definition information 212, and the detailed information of a target state 600. Due to the occurrence of a predictive failure in the physical server 104-2 (HOST-B), the execution plan generation unit 215 specifies the virtual server for jobs 102 (VM-2, VM-3, VM-5) on the physical server 104-2 as the migration target, and determines the physical server 104 of the migration destination with reference to the detailed information of a target state 600. The execution plan generation unit 215 then sets the control pattern 700, the argument 701 and the control destination 702 to generate the first execution plan information 211, as shown in FIG. 7.

The execution plan generation unit 215 subsequently decides whether or not there is a control pattern not yet transformed with reference to the execution plan information 211 and the control pattern transformation definition information 213. In a case where there is a control pattern not yet transformed, the process goes to step 1002, and the process is otherwise finished (step 1001).

The execution plan generation unit 215 transforms one or more control patterns set in the execution plan information 211 to another control pattern defined in the control pattern transformation definition information 213, from the control pattern transformation definition information 213, configuration information, state information and resource information, to temporarily save the transformed control pattern (step 1002). The execution plan generation unit 215 generates new execution plan information 211' including a control pattern coincident with the control pattern name 910 of a transformation source in the control pattern transformation definition information 213 among the control patterns 700 of the first execution plan information 211 generated at the above-described step 1000 according to transformation destination information 920, as shown in FIG. 11.

Here, the control pattern and the argument after transformation being the same as those already present in the execution plan information 211' are integrated together in order to avoid double processing.

In order to decide whether or not the execution plan information 211' temporarily created at step 1002 meets a minimum required condition, the execution plan generation unit 215 decides whether or not the executed execution plan information 211' meets the target state 510 concerning the trigger 500. The execution plan generation unit 215 proceeds to step 1004 in the case of meeting the target state 510, and in the case of not meeting the target state 510, abandons the execution plan information 211' to proceed to step 1001 (step 1003).

The execution plan generation unit 215 compares (for example, numeric comparison) the execution plan information 211' temporarily created at step 1002 to the current execution plan information 211, referring to the evaluation pattern 511 concerning the trigger 500. The execution plan generation unit 215 calculates an evaluation value (time in this example) set in the evaluation pattern 511 for each of the temporarily created execution plan information 211' and the current execution plan information 211.

Then, the execution plan generation unit 215 proceeds to step 1005 in a case where the temporarily created execution plan information 211' is highly evaluated (the evaluation value of the time is small), or proceeds to step 1002 in a case where the current execution plan information 211 is highly evaluated (step 1004). For example, the assumption is made that FIG. 7 shows the execution plan information 211 prior to transformation (current) and FIG. 11 shows the execution plan information 211' after transformation, giving the time (minimization) described in FIG. 5 as the evaluation pattern 511.

First, the execution plan generation unit 215 initializes, on the memory 208 or the like, the evaluation value of the execution plan information 211 of FIG. 7 used for evaluation, by setting a default value at zero. The execution plan generation unit 215 then compares the values between the control pattern 700 and the control pattern 710 of FIG. 8, concerning the first entry of the execution plan information 211 of FIG. 7, and refers a row of FIG. 8 having the same value. In the examples of FIG. 7 and FIG. 8, a row of FIG. 8 having "migration of VM for jobs" is referred. The execution plan generation unit 215 then adds the referred execution time 712 of FIG. 8 to the evaluation value of FIG. 7. In the examples of FIG. 7 and FIG. 8, "2" is added to the evaluation value, resulting in 2(0+2).

The execution plan generation unit 215 then adds the same execution time as that processed for the first row to the evaluation value for the second row of the execution plan information 211 of FIG. 7. In the examples of FIG. 7 and FIG. 8, the evaluation value results in 4(0+2+2) at this point. Similarly, the execution time 712 is hereinafter added to the evaluation value for all entries of FIG. 7 so that all evaluation values of FIG. 7 are calculated. In the examples of FIG. 7 and FIG. 8, the execution plan generation unit 215 provides all evaluation values of FIG. 7 with 6(0+2+2+2).

The execution plan generation unit 215 calculates an evaluation value for the execution plan information 211' after transformation in order to also calculate an evaluation value after transformation. First, the execution plan generation unit 215 initializes, on the memory 208 or the like, the evaluation value of the execution plan information 211' of FIG. 11 used for evaluation, by setting a default value at zero. The execution plan generation unit 215 then compares the values between the control pattern 1100 and the control pattern 710 of FIG. 8, concerning the first entry of the execution plan information 211' of FIG. 11, and refers an entry of FIG. 8 having the same value. In the examples of FIG. 11 and FIG. 8, an entry of FIG. 8 having "migration of intermediate VM for jobs" is referred. The execution plan generation unit 215 then adds the referred value of the execution time 712 of FIG. 8 to the evaluation value of execution plan information 211' of FIG. 11. In the examples of FIG. 11 and FIG. 8, "3" is added to the evaluation value, resulting in 3(0+3).

The execution plan generation unit 215 then performs arithmetic for the evaluation value concerning the second entry of FIG. 11 as with the first entry. In the examples of FIG. 11 and FIG. 8, the evaluation value results in 5(0+3+2) at this point. In the examples of FIG. 11 and FIG. 8, all evaluation values of FIG. 11 result in 5(0+3+2).

The execution plan generation unit 215 numerically compares the evaluation values of the execution plan information 211 of FIG. 7 and the execution plan information 211' of FIG. 11 in evaluation at step 1004. Numeric comparison for these evaluation values of the time results in higher evaluation for the execution plan information 211' after transformation having a shorter time required for execution (the evaluation value is small).

The execution plan generation unit 215 replaces the current execution plan information 211 by the execution plan information 211 temporarily created at step 1002, and returns to step 1001 to perform processing of next execution plan information 211 (step 1005).

By the processing above, the execution plan information 211 already set can be changed to a control pattern with a higher evaluation value (execution plan information 211'). Moreover, the evaluation values are compared between the execution plan information 211 and the execution plan information 211' after transformation, and one of the evaluation values of the execution plan information meeting a predetermined condition can be selected.

FIG. 11 is an example of the execution plan information, wherein the execution plan information of FIG. 7 is transformed by processing of the flowchart of FIG. 10 described above. In a configuration of the computer system of the present embodiment, since many virtual servers like the virtual servers for jobs 102-2, 102-3 and 102-5 (VM-2, VM-3 and VM-5) are operated on the physical server 104 (HOST-B) as shown in FIG. 1B, it is possible to perform processing at higher speed by migrating a plurality of virtual servers for jobs VM-2 and VM-3 at one time through migration of the intermediate virtual server 102-4 (VM-4), rather than migration of virtual servers VM-2, VM-3 and VM-5 one by one. Therefore, the first execution plan information 211 shown in FIG. 7 is transformed to the execution plan information 211' shown in FIG. 11. On the other hand, in a case where there are less virtual servers 102 operated on HOST-B, it may be faster to migrate the virtual servers 102 one by one.

Figure 20A:
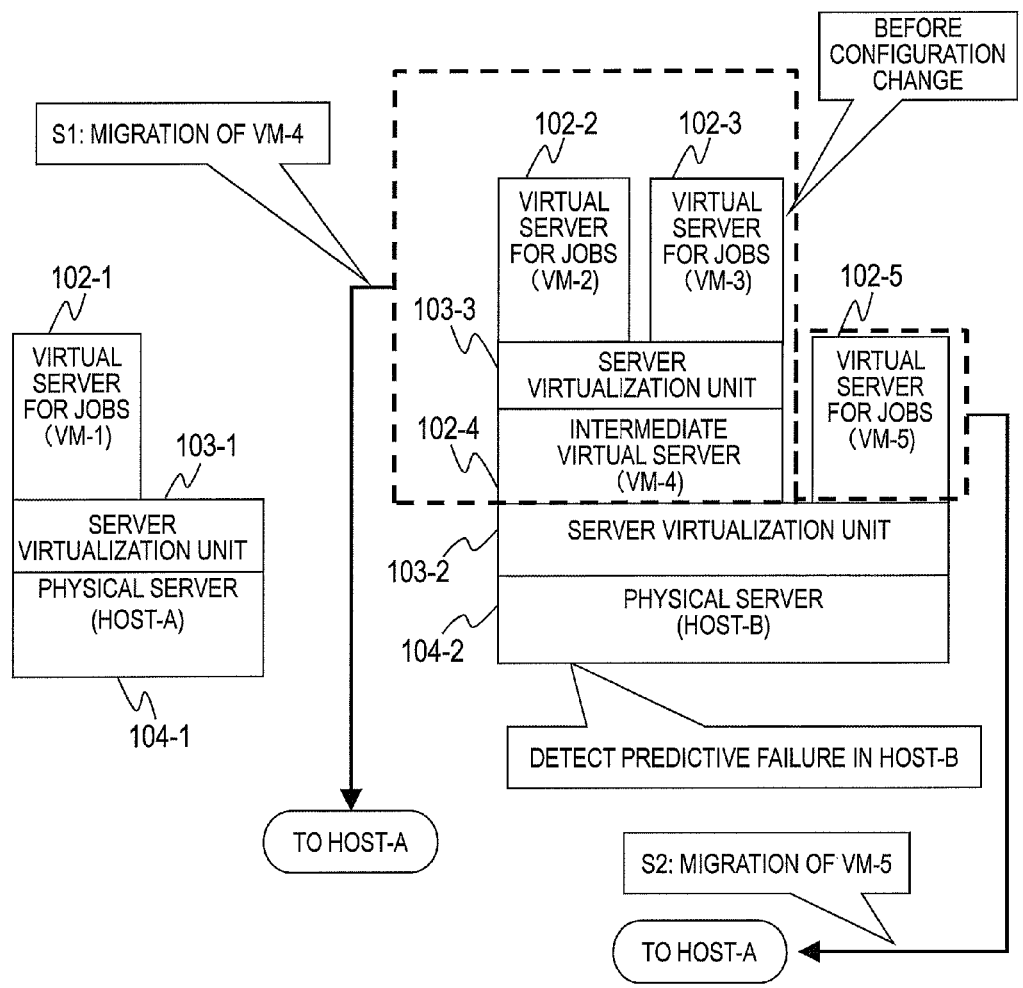
FIG. 20A shows the first embodiment of this invention, and is a block diagram showing configurations of the servers prior to execution of the execution plan information.
Figure 20B:
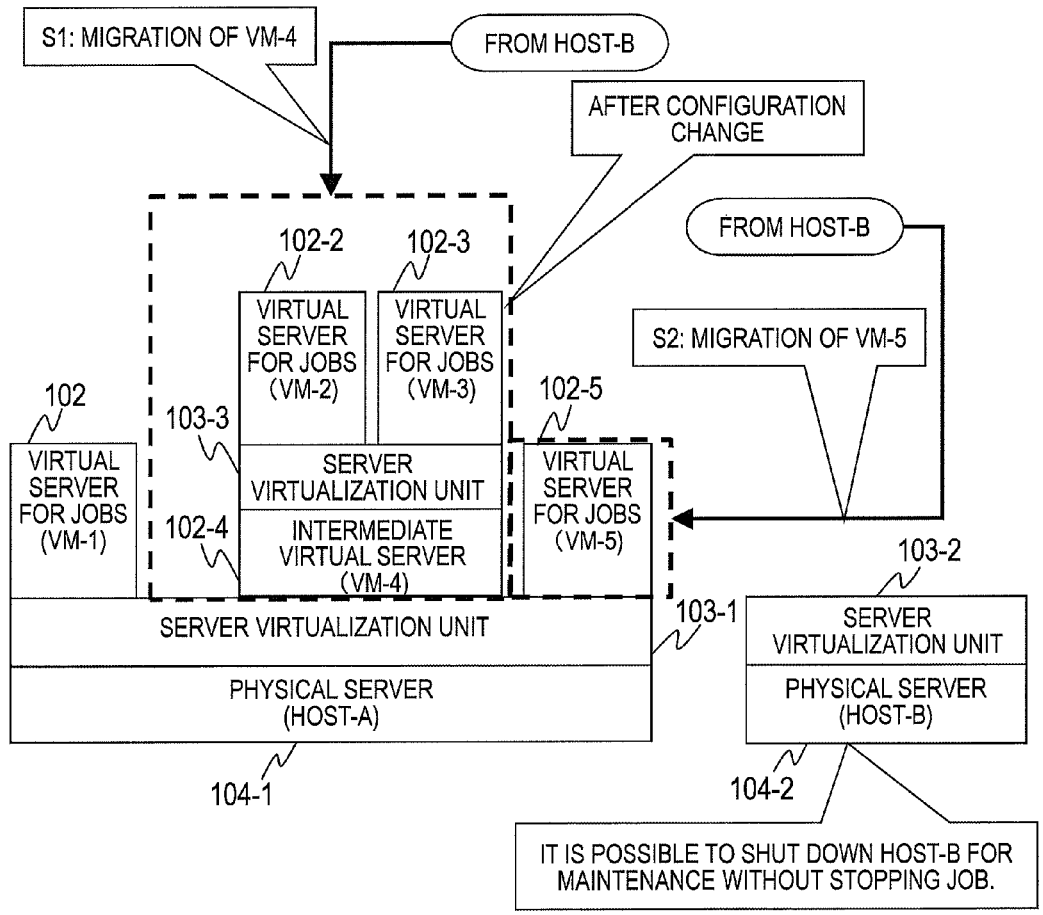
FIG. 20B shows the first embodiment of this invention, and is a block diagram showing configurations of the servers after execution of the execution plan information.

FIG. 20A and FIG. 20B are block diagrams showing configurations of the physical server 104-1 (HOST-A) and the physical server 104-2 (HOST-B) prior to execution (FIG. 20A) and after execution (FIG. 20B) of the execution plan information 211' shown in FIG. 11.

As shown in FIG. 11, the intermediate virtual server 102-4 (VM-4) and the virtual server for jobs 102-5 (VM-5) on the physical server 104-2 (HOST-B) are migrated onto the physical server 104-1 (HOST-A), form the execution plan information 211' after transformation.

At the time, the virtual server for jobs 102-2 (VM-2) and the virtual server for jobs 102-3 (VM-3) operated on the intermediate virtual server 102-4 (VM-4) are also migrated at the same time as the intermediate virtual server 102-4 (VM-4). The management server 200 commands each server virtualization unit 103 in such a way that the migration of the virtual server 102 causes the server virtualization unit 103-2 to transfer data of the virtual server 102 on the memory 208 of the physical server 104 of a migration source onto the memory 208 via the server virtualization unit 103-1 of the physical server 104 of a target destination through the network 1010.

The management server 200 switches a path to the virtual server image storage disk 107 and the definition information storage disk 108 in the disk array system 106 storing data of the virtual server 102, from the HBA 302 in the physical server 104-2 (HOST-B) of a migration source to the HBA 302 in the physical server 104-1 (HOST-A) of a migration destination.

Further, in the migration of the virtual server 102, the virtual server 102 as a migration target is suspended, stopped or deactivated (cancellation of logical partition allocation), thereafter transferring data of the virtual server 102 in the virtual server image storage disk 107 and the definition information storage disk 108 of the disk array system 106 coupling to the physical server 104-2 (HOST-B) of a migration source into the disk array system 106 coupling to the physical server 104-1 (HOST-A) of a migration destination, followed by activation of the virtual server 102. Such processing is performed by a command given by the management server 200 to each of the server virtualization units 103 and the storage switch 105. This makes it possible to perform migration immediately from the physical server 104-2 (HOST-B) having a predictive failure occurred to a normal physical server 104-1 (HOST-A) as compared to individual migration of the virtual server for jobs 102 (VM-2), the virtual server for jobs 102 (VM-3) and the virtual server for jobs 102 (VM-5).

Figure 18:
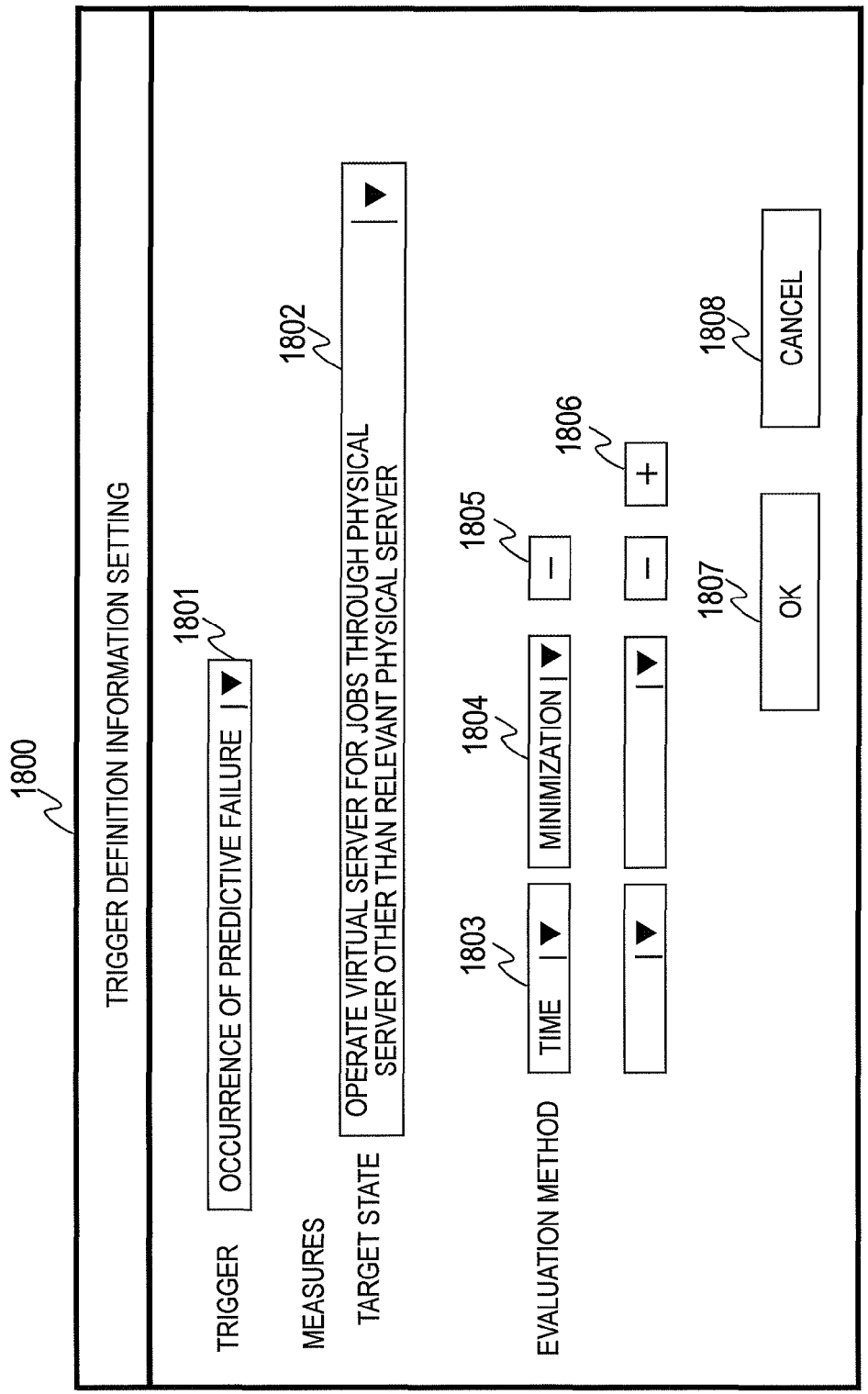
FIG. 18 shows the third embodiment of this invention, and is an example of a Graphical User Interface for setting the trigger definition information.

FIG. 18 shows an example of a GUI (Graphical User Interface) for setting the trigger definition information 210. This GUI is a screen image displayed on the output device 112 coupled to the management server 200, a display device of the other terminal coupled to the management server 200 directly or via the network switch 101, with use of a browser, a dedicated program, a text and the like. Such screen image is manipulated with use of the input device 111 coupled to the management server 200 and an input device of the other terminal coupled to the management server 200 directly or via the network switch 101.

A button and the like for manipulation are displayed on a trigger definition information setting window (screen image) 1800. An administrator clicks a desired trigger from a pull-down menu 1801 to input a trigger to be set here. In the illustrated example, a trigger selected by an administrator is displayed on the pull-down menu 1801. The administrator clicks a pull-down menu 1802 to input or select a target state with respect to the trigger of the pull-down menu 1801. In the illustrated example, the target state selected by the administrator is displayed on the pull-down menu 1802. The administrator clicks a pull-down menu 1803 to input an evaluation index of an evaluation pattern with respect to the trigger of the pull-down menu 1801. The administrator clicks a pull-down menu 1804 to input an additional evaluation index of the evaluation pattern with respect to the trigger of the pull-down menu 1801.

The evaluation index of the pull-down menu 1803 and the additional evaluation index of the pull-down menu 1804 input by the administrator are evaluation patterns with respect to the trigger of the pull-down menu 1801. The administrator can add a new evaluation pattern by clicking a button 1806. In a case where the trigger of the pull-down menu 1801 has two or more evaluation patterns, a plurality of evaluation patterns are provided as a product condition. The administrator can delete the input evaluation indexes of the pull-down menus 1803 and 1804 by clicking a button 1805.

The administrator can update the setting of the trigger definition information 210 by clicking a button 1807, and cancel the setting by clicking a button 1808.

Figure 19:
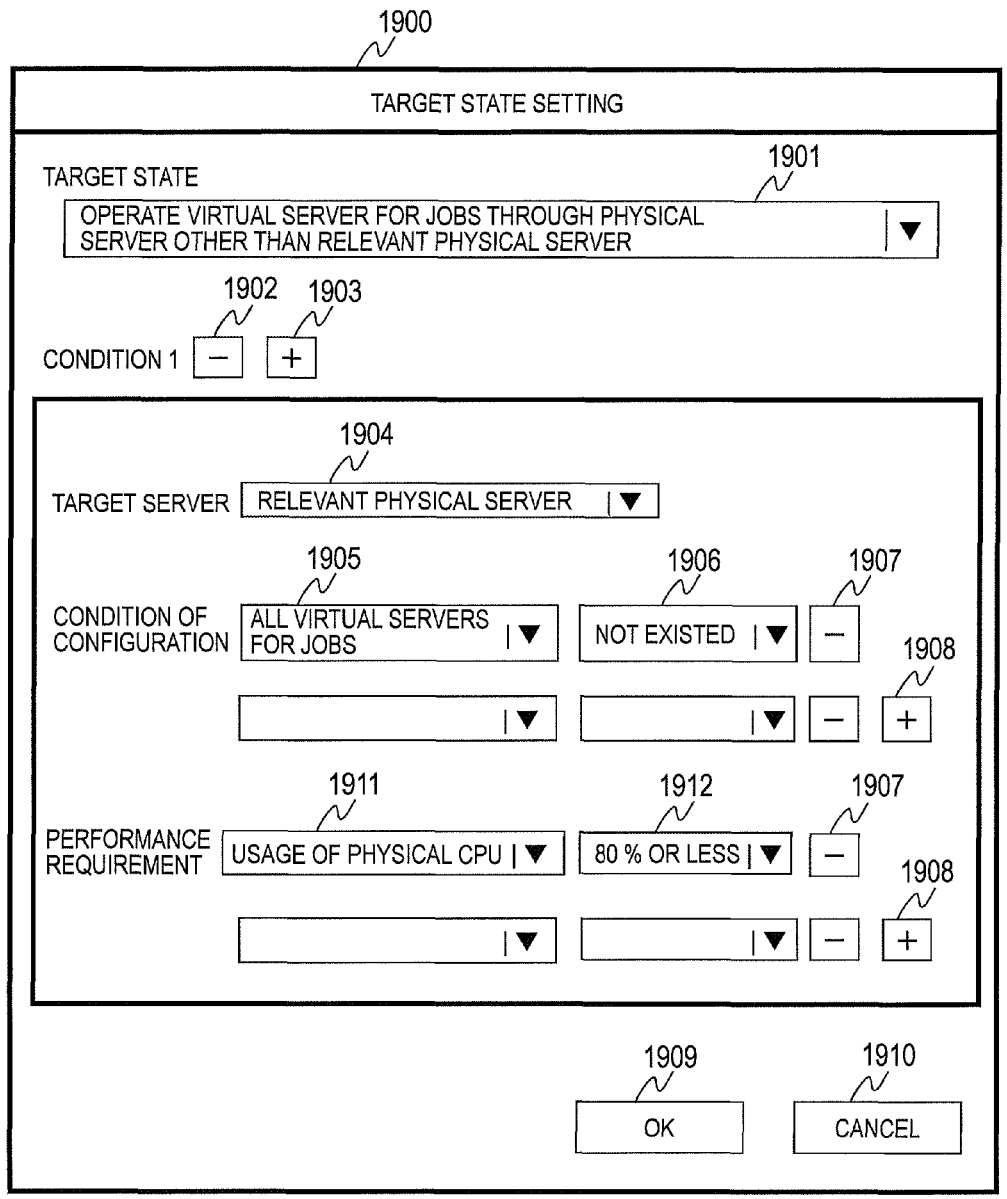
FIG. 19 shows the third embodiment of this invention, and is an example of a screen image of a GUI for setting a specific conditional expression of a target state.

FIG. 19 shows an example of a screen image of a GUI (Graphical User Interface) for setting a specific conditional expression of a target state used in FIG. 18. This GUI is displayed on the output device 112 coupled to the management server 200, a display device of the other terminal coupled to the management server 200 directly or via the network switch 101, with use of a browser, a dedicated program, a text and the like. The screen image is then manipulated with use of the input device 111 coupled to the management server 200 and an input device of the other terminal coupled to the management server 200 directly or via the network switch 101.

On a target state setting window 1900, a button and the like for manipulation are displayed. The administrator clicks a pull-down menu 1901 to input a target state to be set here. In an example of the drawing, a trigger selected by an administrator is displayed on the pull-down menu 1901. The administrator can add a new condition by clicking a button 1903. The administrator can delete the added condition by clicking a button 1902.

The administrator clicks a pull-down menu 1904 to input a server as a target of a conditional expression of a target state of the pull-down menu 1901. In an example of the drawing, a target state selected by an administrator is displayed on the pull-down menu 1904. Items selectable by the administrator in the pull-down menu 1904 include: the physical server 104, the intermediate virtual server 102, the virtual server for jobs 102, the association management server 100, the network switch 101, the storage switch 105, the system disk 109 and the data disk 110 associated with the target state of the pull-down menu 1901 in FIG. 19; and an identifier for directly designating a source of a trigger.

The administrator clicks a pull-down menu 1905 to input information on a target of a condition among specific conditions of a conditional expression concerning a configuration of the target state of the pull-down menu 1901. Items selectable by the administrator in the pull-down menu 1905 include: identifiers for identifying the physical server 104, the intermediate virtual server 102, the virtual server for jobs 102, the association management server 100, the network switch 101, the storage switch 105, the system disk 109 and the data disk 110; and a group thereof (for example, all virtual servers for jobs 102).

The administrator clicks a pull-down menu 1906 to input information on a state of a condition among specific conditions of a conditional expression concerning the configuration of the target state of the pull-down menu 1901. Items selectable by the administrator in the pull-down menu 1905 include presence/absence, a state (for example, power-off) and the like in a target server 1904 in the pull-down menu 1905.

The administrator clicks a pull-down menu 1911, thereby making it possible to input information on a target of a condition among specific conditions of a conditional expression concerning performance of the target state of the pull-down menu 1901. Items selectable by the administrator in the pull-down menu 1911 include a usage rate of a CPU, usage of memory, a usage rate of a network bandwidth, and usage of a disk. The administrator clicks a pull-down menu 1912, thereby making it possible to input information on a state of a condition among specific conditions of a conditional expression concerning performance of the target state of the pull-down menu 1901. Items selectable by the administrator in the pull-down menu 1912 include X % or less (X is a numeric value), X % or more (X is a numeric value), less than X % (X is a numeric value), and more than X % (X is a numeric value), with respect to a target of a condition of the pull-down menu 1911.

The administrator can add a new condition by clicking a button 1908. The administrator can delete the added condition by clicking a button 1907. The administrator can update the setting by clicking a button 1909, and can cancel the setting by clicking a button 1910.

According to the present embodiment, it is possible for the execution plan generation unit 215 to generate the execution plan information 211 selecting a control pattern suitable for a target with respect to the trigger definition information 210 based on dynamic information of the system (configuration information, state information, resource information, and the like).

As described above, according to the first embodiment of the present invention, the management server 200 transforms, in the event of a predetermined trigger, the execution plan information 211 to a different control pattern from the control pattern transformation definition information 213 to select execution plan information evaluated good, by comparing an evaluation value of the execution plan information 211 prior to transformation and an evaluation value of the execution plan information 211' after transformation. This makes it possible to generate the execution plan information 211 having a less time required for a dynamic change corresponding to the operated state of the virtual server 102 and the physical server 104 at the time of occurrence of a predictive failure in the physical server 104. This makes it possible to update a control pattern for making a dynamic change to an optimal content even if the operated state of the virtual server 102 and the physical server 104 changes, in the management server 200.

Note that, the above-described embodiment shows an example where the association management server 100 and the management server 200 are configured by computers different from each other, however, the management server 200 may include a function of the association management server 100.

Second Embodiment

In the first embodiment, occurrence of a predictive failure is taken as an example of a trigger of execution of the control pattern determination unit 201, and description has been given for a method of transforming the execution plan information 211 determined by the execution plan generation unit 215 from the trigger definition information 210 to the execution plan information 211' based on dynamic information of a computer system.

In the second embodiment, an example will be described where the management server 200 decides, when transforming one or more control patterns of the execution plan information 211, whether or not the transformed control pattern is executable. Such decision is made, for example, for deciding whether or not it is possible to secure a computer resource required for the transformed control pattern to select executable execution plan information 211.

In the present embodiment, a threshold crossing of computer resource usage (the case of scarceness of resources) of the intermediate virtual server 102-4 (VM-4) is taken as an example of a trigger for running the control pattern determination unit 201. The second embodiment has the same configuration as that of the first embodiment except that a part of information composition of the detailed information of a target state 600 or the like in the first embodiment is changed.

FIG. 12 is an example of detailed information of a target state 600A in the second embodiment. The detailed information of a target state 600A corresponds to the target state 510 of the trigger definition information 210 in the first embodiment.

In the present embodiment, resource usage of the intermediate virtual server 102 exceeds a threshold, thereby triggering execution of the control pattern determination unit 201. Therefore, the target state 510 is set so that resource usage rate of the intermediate virtual server 102 is lowered to a threshold or less as shown in a second entry 5011 in FIG. 5. The threshold set in advance for the management server 200 is used here. In the present embodiment, a threshold of a usage rate of a CPU is 70%, and a threshold of a usage rate of memory is 80%.

The detailed information of a target state 600A shown in FIG. 12 includes a VM (virtual server) name 610 as an identifier for identifying the virtual server 102 and a resource usage rate threshold 1211 for indicating a threshold of each unit included in the physical server 104, in order to indicate values of specific system configuration, state and resource for meeting the target state 510. Here, the resource usage rate 1211 has information on a configuration of a CPU 1220, memory 1221 and the like as sub-columns. Each sub-column has a threshold for each unit included in the virtual server 102, indicated by an expression, a value or the like.

FIG. 13 is an example of the control pattern definition information 212 in the present embodiment. A target state in the present embodiment is provided for the purpose of reduction in a resource usage rate of the intermediate virtual server to a threshold or less. The way of reduction is provided by means of not only migration of the virtual server 102 operated on a relevant server to the other server virtualization unit 103 but also changing of the amount of a computer resource allocated to the relevant server (intermediate virtual server 102). It is however possible to make an incremental change in an allocation resource amount only in the case of having a surplus physical resource in the relevant server. Therefore, the execution plan generation unit 215 of the management server 200 has to decide whether or not it is possible to increase the allocation resource amount with reference to physical resource information.

FIG. 14 is an example of the control pattern transformation definition information 213 in the present embodiment. In the present embodiment, concerning FIG. 9 about the first embodiment, a new control pattern is added to the control pattern definition information 212 so that new control pattern transformation information is also added to the control pattern transformation definition information 213.

Figure 15:
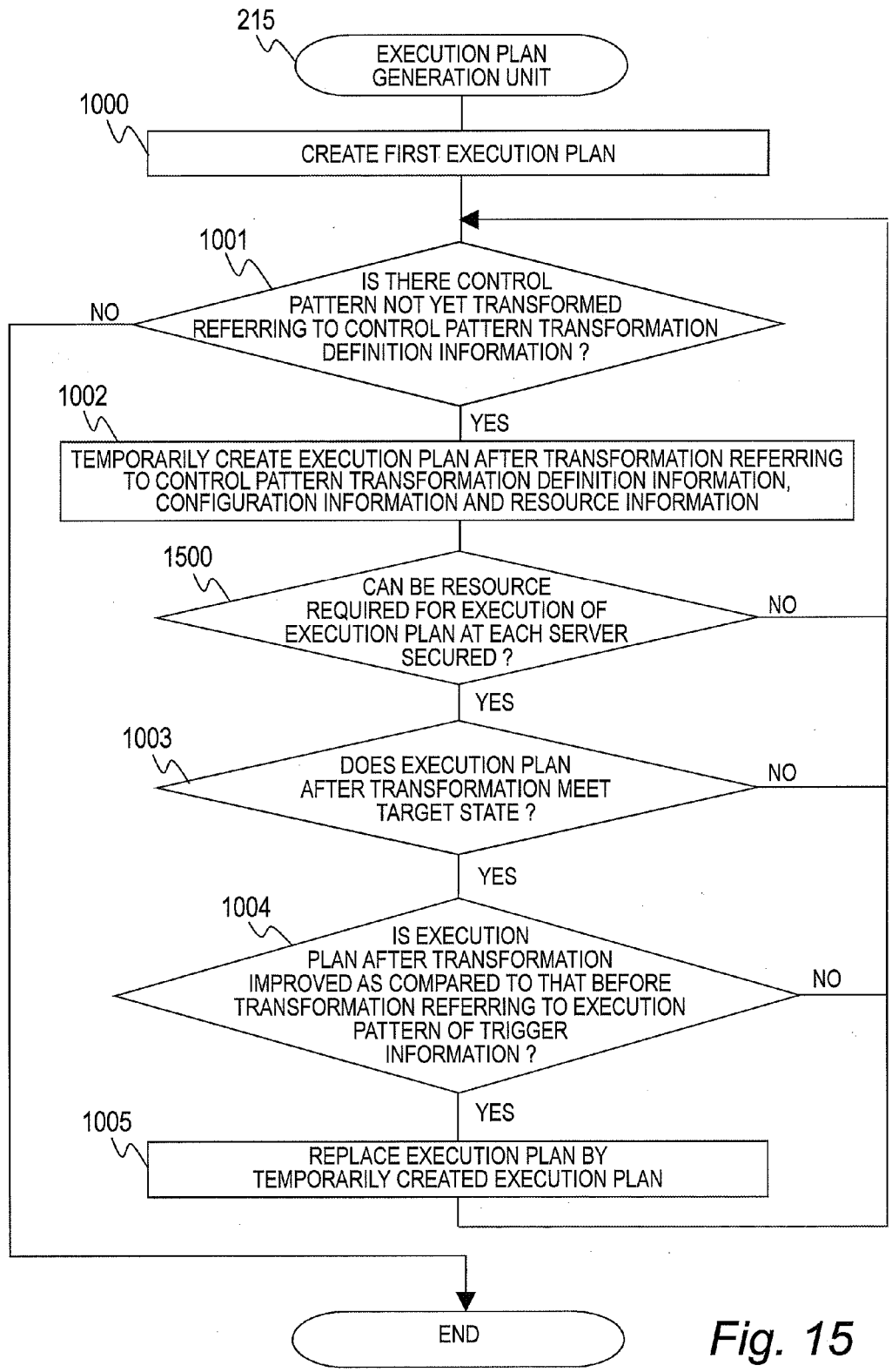
FIG. 15 shows the second embodiment of this invention, and is a flowchart showing an example of processing performed at the execution plan generation unit.

FIG. 15 is a flowchart showing an example of processing performed at the execution plan generation unit 215 in the second embodiment. The processing of FIG. 15 is changed from the processing of the execution plan generation unit 215 shown in FIG. 10 about the first embodiment, according to the present embodiment. Step 1500 is added in FIG. 15, which is provided differently from FIG. 10. The execution plan generation unit 215 decides, when executing an execution plan temporarily created at step 1002 for each server, whether or not a computer resource required for execution can be secured. The execution plan generation unit 215 proceeds to step 1003 in a case where the computer resource can be secured, and in a case where the computer resource cannot be secured, abandons the execution plan information 211' to proceed to step 1001 (step 1500). In such decision, the execution plan generation unit 215 decides, for example, in a case where the execution plan information 211 includes a resource allocation change of an intermediate VM and an allocation change in a computer resource is made that an argument is set such that a new CPU resource amount (for example, the number of CPU cores) is two, whether or not it is possible to newly secure two CPU cores on the physical server 104 having the intermediate virtual server 102 operated, with reference to resource information of the resource management unit 202.

According to the second embodiment, the execution plan generation unit 215 can generate the execution plan information 211' assuredly executable for each server.

Third Embodiment

In the second embodiment, occurrence of a threshold crossing of resource usage (the case of scarceness of resources) of the intermediate virtual server 102-4 is taken as an example of a trigger for running the control pattern determination unit 201. Additionally, description has been given for the way to create the execution plan information 211 obtained by the execution plan generation unit 215 from the trigger definition information 210, which is decided whether or not to be executable for each server. In the third embodiment, description will be given for a configuration for securing a computer resource more surely when the control pattern determination unit 201 uses the execution plan information 211 and the control unit 204 to dynamically control a computer system.

Figure 16:
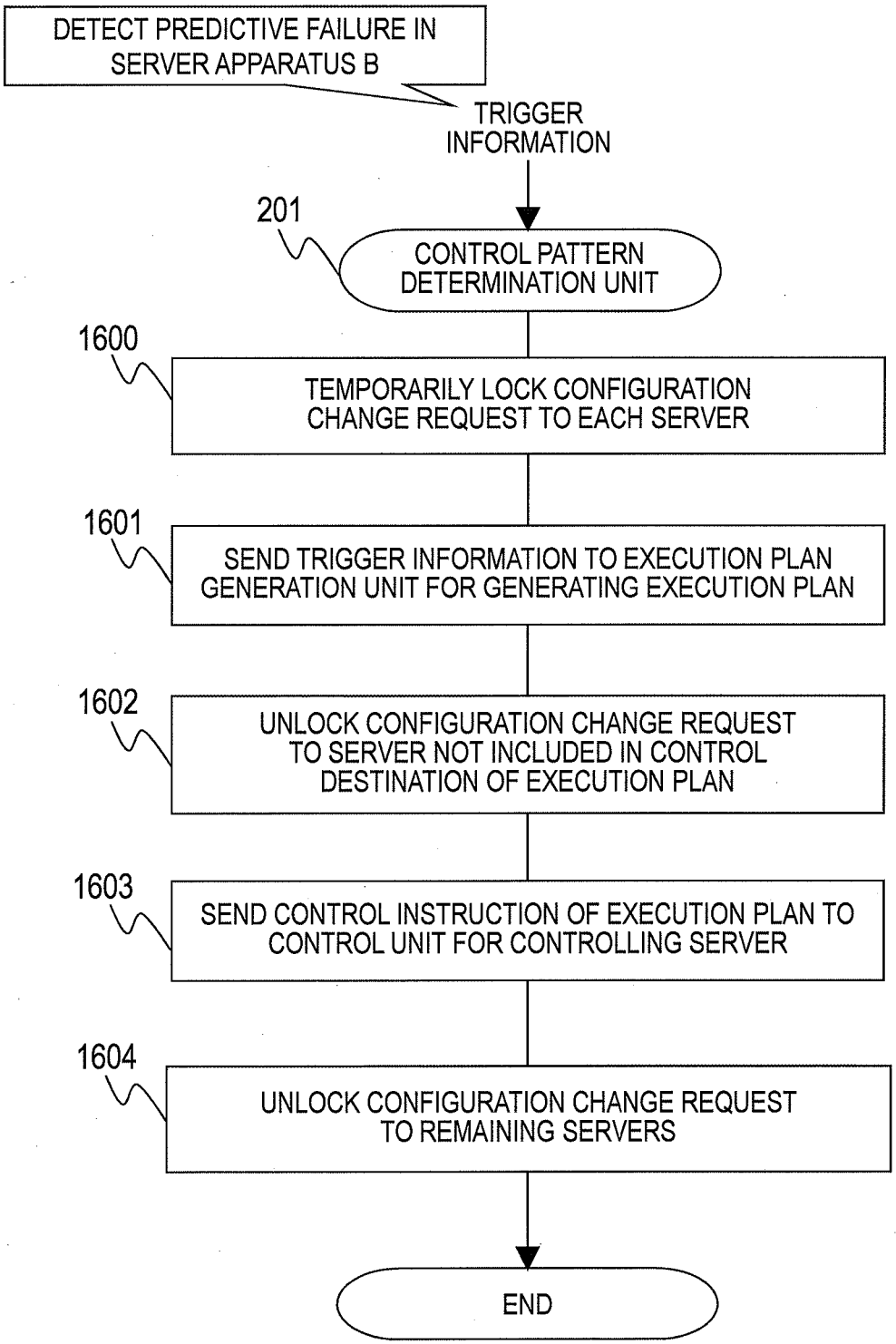
FIG. 16 shows a third embodiment of this invention, and is a flowchart showing an example of processing performed at the control pattern determination unit.

FIG. 16 is a flowchart showing an example of processing performed at the control pattern determination unit 201 in the present embodiment. The control pattern determination unit 201 starts processing based on trigger information (for example, detection of a predictive failure) from the management server 200.

The control pattern determination unit 201 temporarily locks (stops) a configuration change request for all servers to be managed (step 1600). The control pattern determination unit 201 sends the above-described trigger information to the execution plan generation unit 215 to create the execution plan information 211 (step 1601).

The control pattern determination unit 201 unlocks a configuration change request for a server not included in a control destination 1102 of the execution plan information 211 among configuration change requests for each server locked at step 1600 (step 1602).

The control pattern determination unit 201 sends a control instruction included in the execution plan information 211 to the control unit 204 for controlling a target server (step 1603). The control pattern determination unit 201 unlocks a configuration change request for a server other than the server unlocked at step 1602 (step 1604). After migration of the virtual server 102 as a migration target is completed, the management server 200 resumes acceptance of a configuration change request for all virtual servers 102 and the physical server 104.

According to the present embodiment, a configuration change request for all servers to be managed is temporarily locked (stopped), and the control pattern determination unit 201 thereafter generates the execution plan information 211, thereby making it possible to generate the execution plan information 211 in a state where a change in a computer resource of each physical server 104 is inhibited. Subsequently, in a state where the virtual server 102 as a migration target and the physical server 104 stop acceptance of a configuration change request, the management server 200 achieves the execution plan information 211 (or execution plan information 211'), thereby making it possible to reduce a risk of an unsuccessful configuration change due to a computer resource impossible to be secured.

Fourth Embodiment

In the first embodiment, occurrence of a predictive failure is taken as an example of a trigger of execution of the control pattern determination unit 201, and description has been given for a configuration that the execution plan generation unit 215 transforms execution plan information for trigger information to the execution plan information 211' based on dynamic information of a system. In the fourth embodiment, providing maintenance for a case is taken as an example of a trigger for running the control pattern determination unit 201, and description will be given for a pattern other than time in the evaluation pattern 511 of the execution plan information 211. Update of firmware provided in a case, replacement of hardware and the like are taken as an example of maintenance for a chassis. Note that, a configuration of a computer system here is the same as that of the first embodiment.

FIG. 17 is an example of the control pattern definition information 212 in the present embodiment. FIG. 17 shows the present embodiment similarly to the first embodiment, having the control pattern definition information 212 shown in FIG. 8 changed for the present embodiment. The number of configuration changes 713 is added in FIG. 17 in place of an execution time, which is provided differently from FIG. 8.

For providing maintenance for a chassis accommodating the physical server 104, as with occurrence of a predictive failure, the virtual server for jobs 102 has to be operated in another physical server 104 (by means of migration of the virtual server 102, and the like) in order to avoid stoppage of a job in maintenance. However, unlike occurrence of a predictive failure, it is important to lessen a configuration change (setting of a virtual server (for example, setting of a network such as a VLAN tag and a resource allocation amount), a parent-child relationship among the physical server 104, the intermediate virtual server 102 and the virtual server for jobs 102, and the like), rather than an execution time, for the purpose of controlling the virtual server 102 and the physical server 104 with respect to such a target state.

This is because a small number of temporary configuration changes (man-hours) allows less labor than that for bringing a server back to an original configuration after completion of maintenance for a chassis. For the control pattern shown in FIG. 17, changing by means of migration of an intermediate VM is desirable in the case of having many available resources in the other server, however, it may be desirable to distribute and migrate VMs for jobs over a plurality of the other servers.

FIG. 21A, FIG. 21B, FIG. 22A and FIG. 22B are examples of a configuration change in the present embodiment. In these examples, a resource amount in the physical server 104 (HOST-A) should be available for one virtual server for jobs.

Figure 21A:
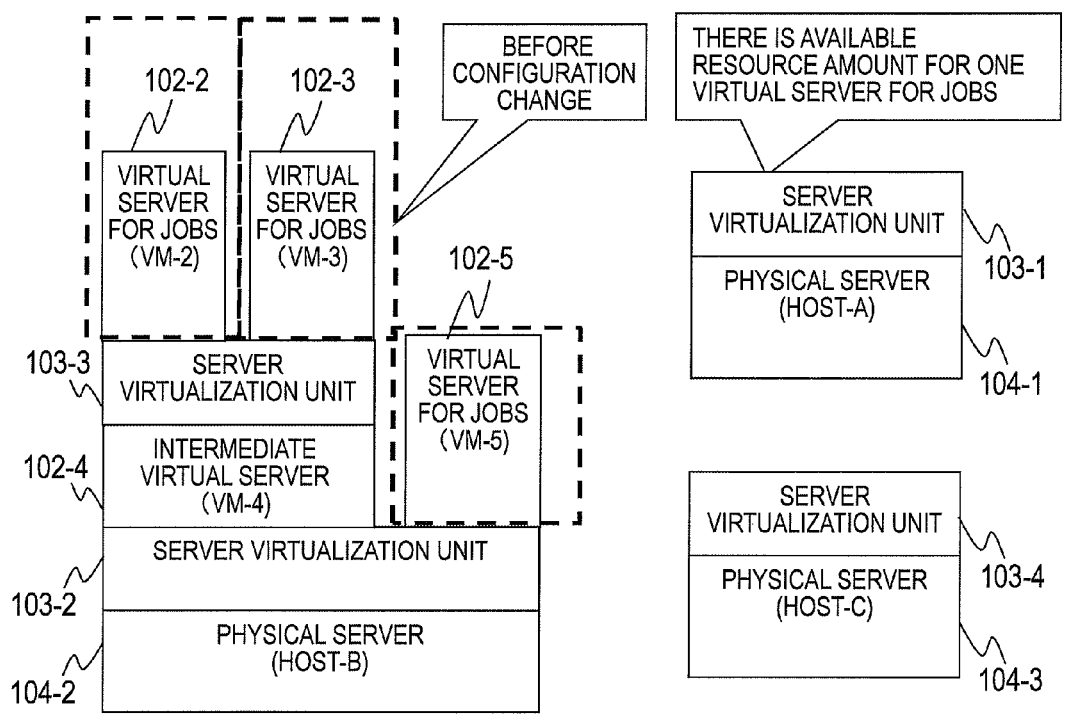
FIG. 21A shows the fourth embodiment of this invention, and is a block diagram showing configurations of the servers prior to execution of the execution plan information.
Figure 21B:
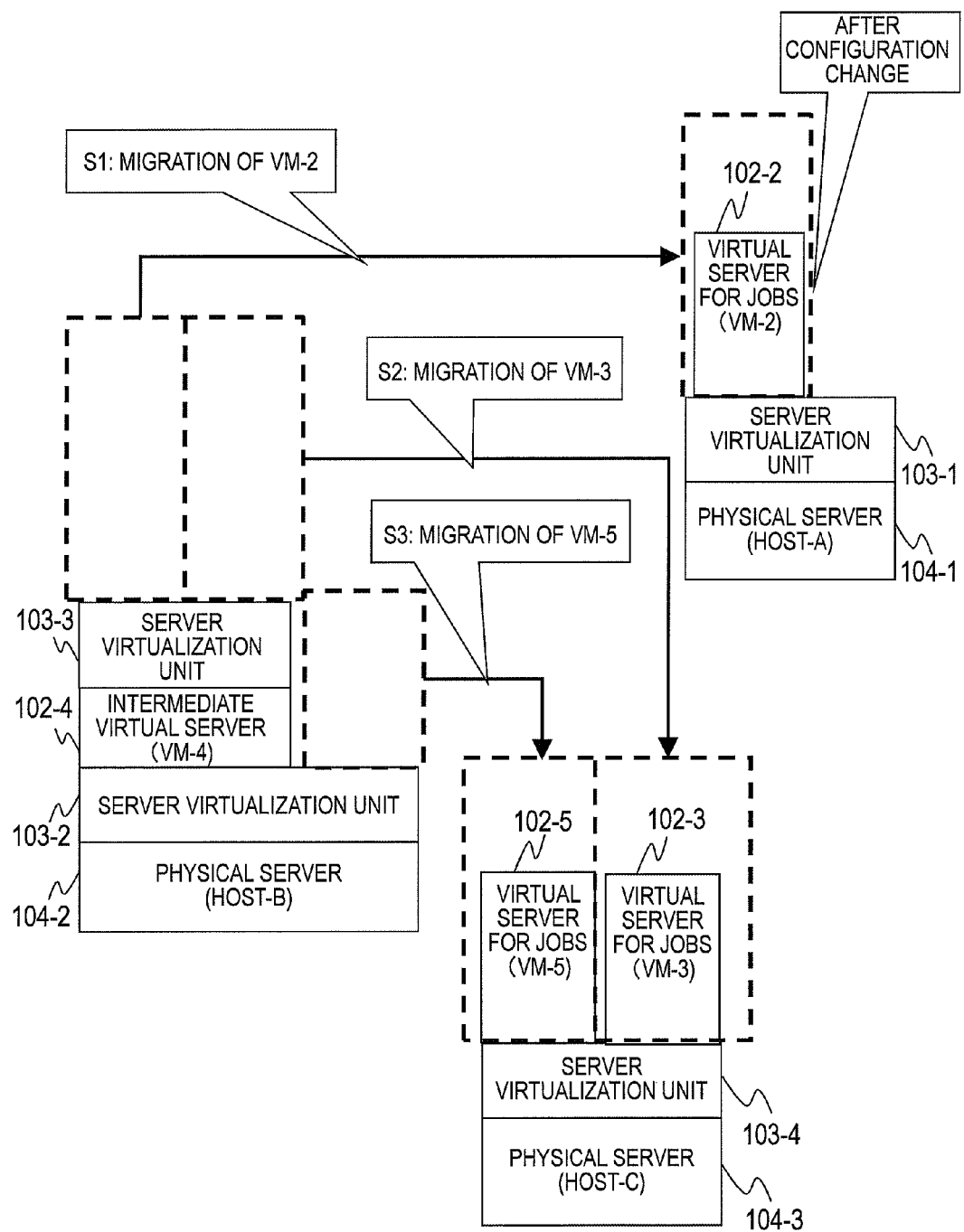
FIG. 21B shows the fourth embodiment of this invention, and is a block diagram showing configurations of the servers after execution of the execution plan information.

FIG. 21A shows a state prior to a configuration change, and FIG. 21B is a configuration example after making a configuration change in a case where the number of configuration changes is not employed for an evaluation pattern of the execution plan information 211. FIG. 21B shows an example where the virtual server for jobs 102-2 on the physical server 104-2 (HOST-B) migrates to the physical server 104-1 (HOST-A), while virtual servers for jobs 102-3 and 102-5 migrate to the physical server 104-3 (HOST-C).

Figure 22A:
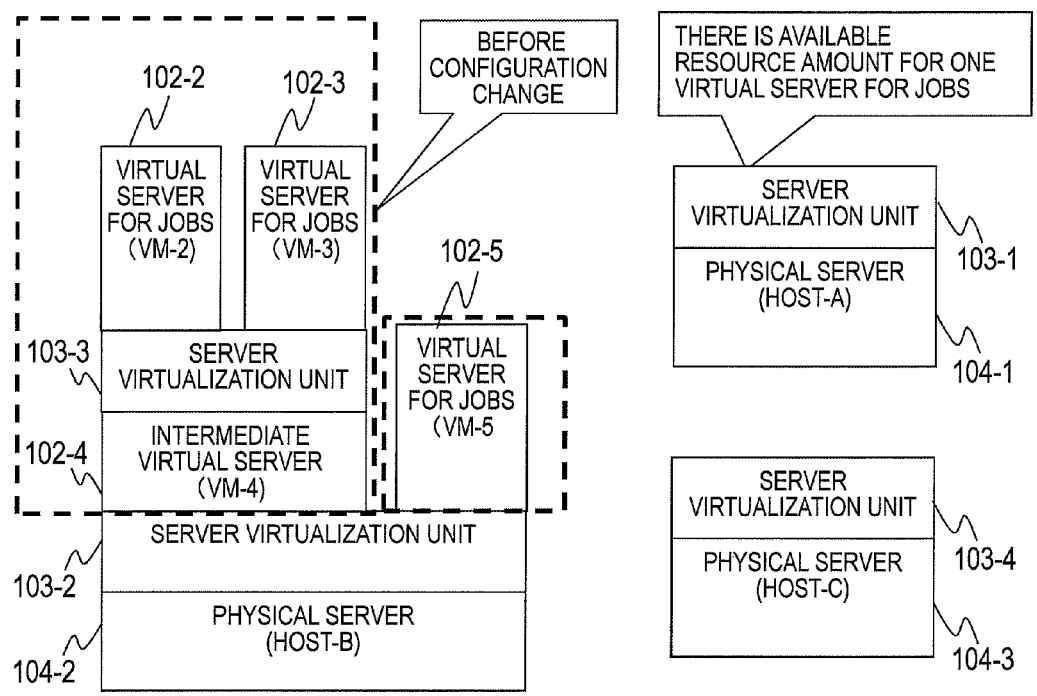
FIG. 22A shows the fourth embodiment of this invention, and is a block diagram showing configurations of the servers prior to execution of the execution plan information.
Figure 22B:
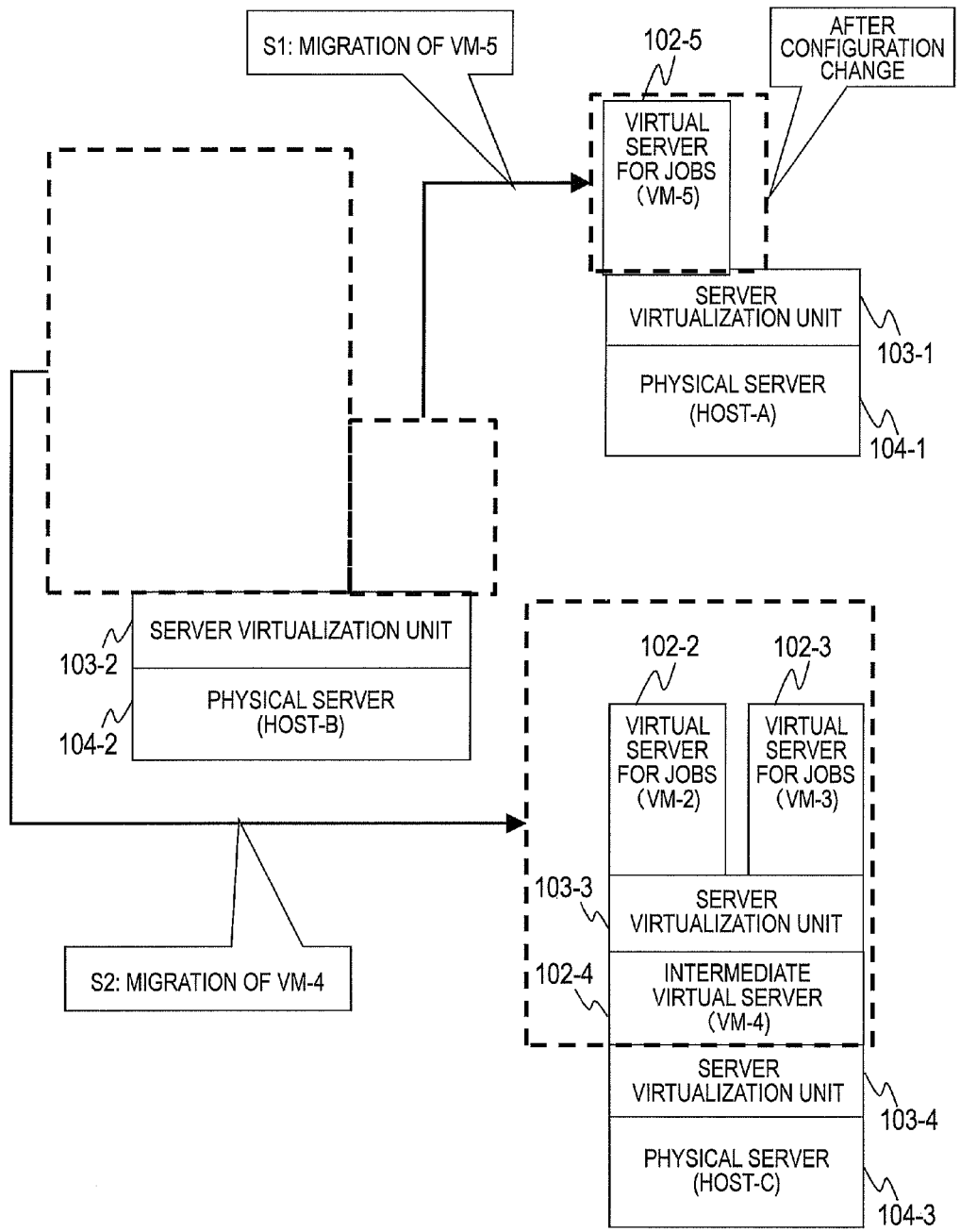
FIG. 22B shows the fourth embodiment of this invention, and is a block diagram showing configurations of the servers after execution of the execution plan information.

FIG. 22A shows a state prior to a configuration change, and FIG. 22B shows a configuration example after making a configuration change in a case where the number of configuration changes is employed for an evaluation pattern of the execution plan information 211. In FIG. 22B, the intermediate virtual server 102 (VM-4) migrates to the physical server 104-3 (HOST-C), thereby omitting a configuration change of the virtual server for jobs 102 (VM-2) and the virtual server for jobs 102 (VM-3). Thereby, in the case of bringing a state back to a state prior to a configuration change again, a configuration of FIG. 22B needs less man-hours for bringing a state back to the state prior to a configuration change as compared to FIG. 21B, so that a configuration change is made in a short time.

Fifth Embodiment

In the first embodiment, occurrence of a predictive failure is taken as an example of a trigger of execution of the control pattern determination unit 201, and description has been given for the way that the execution plan generation unit 215 transforms the execution plan information 211 for trigger information to the execution plan information 211' based on dynamic information of a system. In the fifth embodiment, saving power on weekends is taken as an example of a trigger of execution of the control pattern determination unit 201, and description will be given for the case where there is no target state.

In the fifth embodiment, for an entry 5013 in FIG. 5, a target state is not present (that is, it is possible to take any configuration in execution of an execution plan), and configuration information after execution of the execution plan information 211 and resource information collectable by the resource management unit 202 are used as evaluation patterns rather than information included in the control pattern definition information 212, which are different from the other embodiments.

Figure 23A:
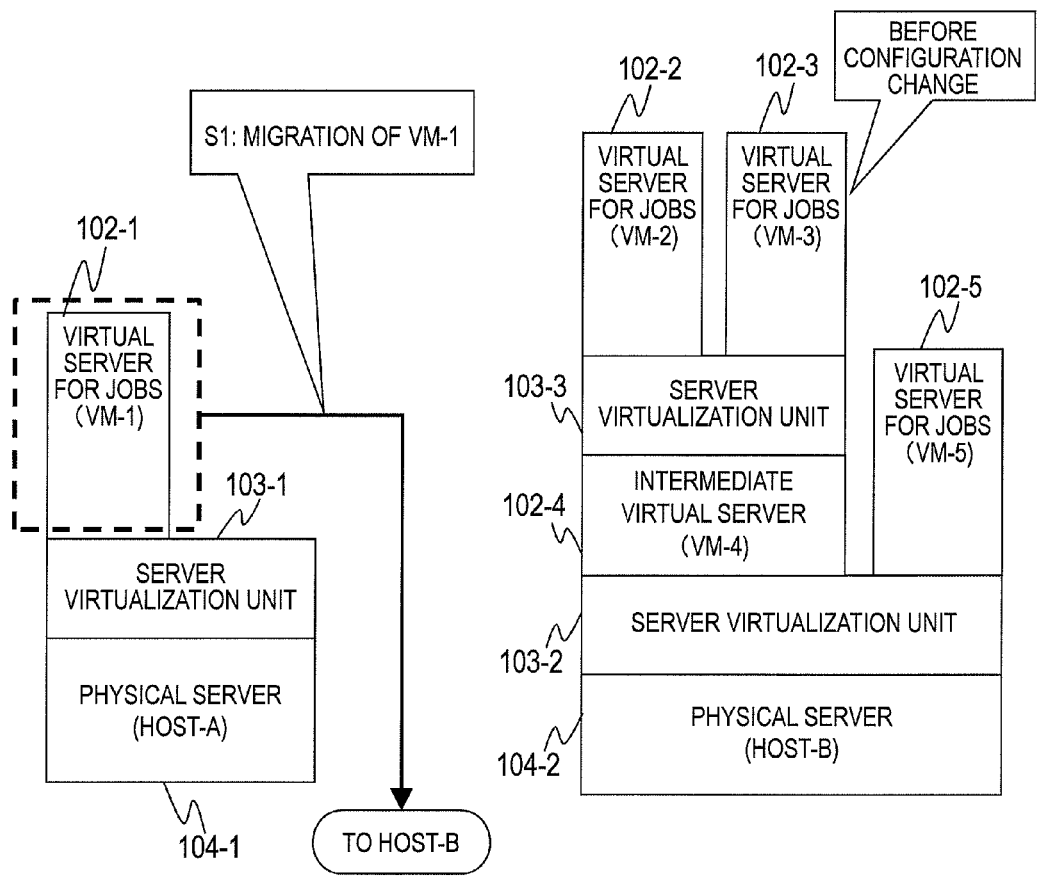
FIG. 23A shows a fifth embodiment of this invention, and is a block diagram showing configurations of the servers prior to execution of the execution plan information.
Figure 23B:
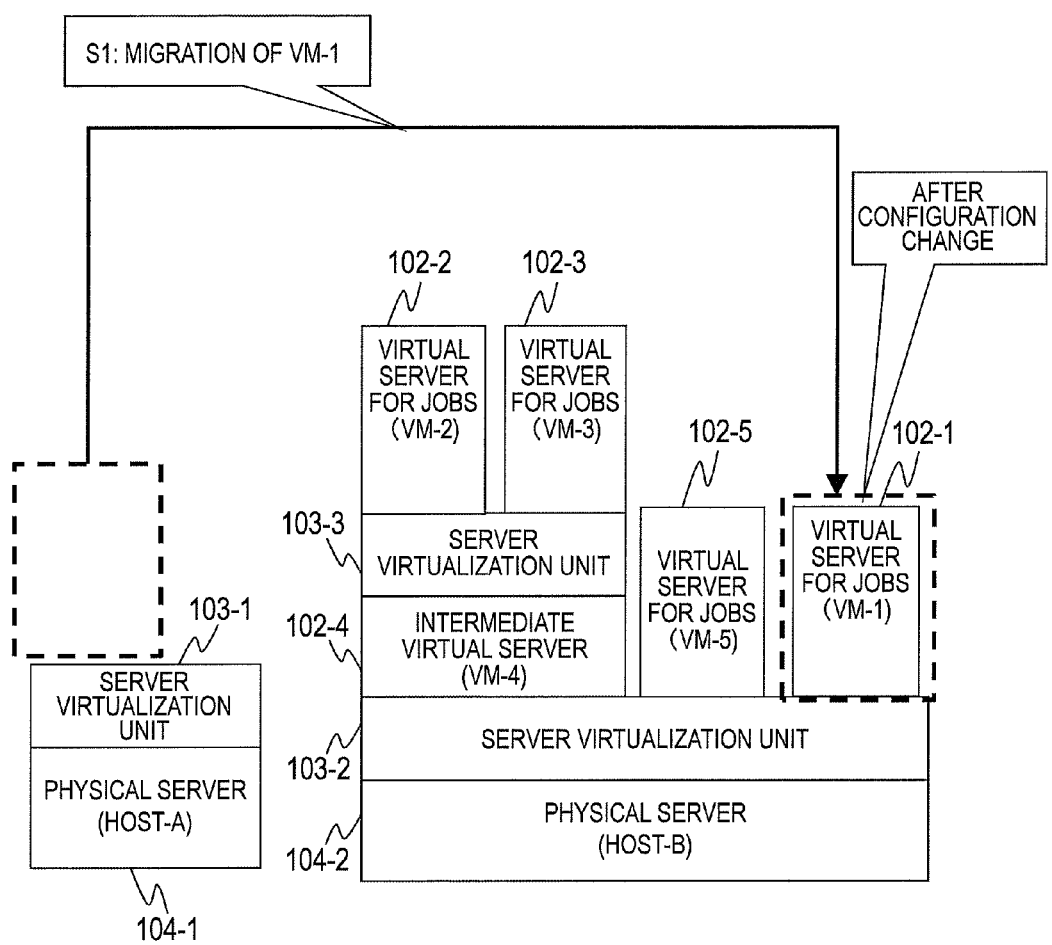
FIG. 23B shows the fifth embodiment of this invention, and is a block diagram showing configurations of the servers after execution of the execution plan information.

FIG. 23A and FIG. 23B show an example of a configuration in the present embodiment. In this example, an average power consumption (minimization) of a server described in an entry 5013 of the trigger definition information 210 in FIG. 5 is used as the evaluation pattern 511. The execution plan information 211 prior to execution is configured in such a way that the virtual servers for jobs 102 are distributed over a plurality of the physical servers 104 (HOST-A and HOST-B) as shown in FIG. 23A.

Here, in the execution plan information 211 minimizing an average power consumption of the physical server 104, for example, the virtual servers for jobs 102 are consolidated into one physical server 104 (HOST-B in FIG. 23B) as much as possible, resulting in an increase in the number of the physical servers 102 (HOST-A in FIG. 23) capable of stopping. This makes it possible to stop unnecessary physical server 104-1 (HOST-A in FIG. 23) so as to reduce an average power consumption of the all physical servers 104.

What is claimed is:

1. A method of controlling a virtual machine, including a physical computer having a virtualization unit providing one or more virtual machines and a management server managing a plurality of the physical computers with a processor and memory so that the management server controls the virtual machine and the virtualization unit, comprising:
   a first step of detecting a predetermined trigger by the management server;
   a second step of acquiring by the management server a relationship between a virtualization unit and a virtual machine operated on the physical computer;
   a third step of specifying by the management server a virtual machine as a migration target based on preset trigger definition information;
   a fourth step of determining by the management server a physical computer of a migration destination based on a preset first control pattern to generate a first plan to migrate the virtual machine as the migration target to the physical computer of the migration destination;
   a fifth step of transforming by the management server the first control pattern to a second control pattern based on preset transformation definition information;
   a sixth step of generating by the management server a second plan to migrate the virtual machine as the migration target to the physical computer of the migration destination based on the transformed second control pattern;
   a seventh step of performing arithmetic by the management server for an evaluation value of the first plan and an evaluation value of the second plan, respectively;
   an eighth step of comparing by the management server the evaluation value of the first plan to the evaluation value of the second plan to select one of the evaluation values meeting a predetermined condition as an execution plan; and
   a ninth step of migrating by the management server the virtual machine as the migration target based on the selected execution plan.

2. The method of controlling a virtual machine according to claim 1, wherein
   the sixth step includes deciding whether or not the second plan meets a target state set in the trigger definition information and abandoning the second plan in the case of not meeting the target state.

3. The method of controlling a virtual machine according to claim wherein
   the sixth step includes acquiring information on a computer resource of the physical computer of the migration destination to decide whether or not the second plan is feasible with the computer resource of the migration destination, and abandoning the second plan in the case of not having the computer resource enough.

4. The method of controlling a virtual machine according to claim 1, wherein
at the fourth step, the management server decides, after stopping acceptance of a configuration change request for the physical computer and the virtual machine, a physical computer of a migration destination based on a preset first control pattern to generate a first plan to migrate the virtual machine as the migration target to the physical computer of the migration destination, and
at the ninth step, the management server keeps stoppage of acceptance of a configuration change request for the virtual machine and the physical computer as the migration target and migrates the virtual machine as the migration target based on the selected execution plan, thereafter resuming acceptance of the configuration change request.

5. The method of controlling a virtual machine according to claim 1, wherein
the virtualization unit includes a first virtualization unit configured to be operated on the physical computer and a second virtualization unit configured to be operated on a first virtual machine operated on the first virtualization unit.

6. The method of controlling a virtual machine according to claim 1, wherein
at the seventh step, the management server performs arithmetic for an index of a time required for executing the first plan and an index of a time required for executing the second plan, respectively, as the evaluation values, and
at the eighth step, the management server selects, as an execution plan, a smaller evaluation value between the evaluation value of the first plan and the evaluation value of the second plan.

7. The method of controlling a virtual machine according to claim 1, wherein
at the seventh step, the management server performs arithmetic for man-hours required for executing the first plan and man-hours required for executing the second plan, respectively, as the evaluation values, and
at the eighth step, the management server selects, as an execution plan, a smaller evaluation value between the evaluation value of the first plan and the evaluation value of the second plan.

8. The method of controlling a virtual machine according to claim 1, wherein
in the trigger definition information, the types of a target state and an evaluation value corresponding to the type of a trigger are preset.

9. A virtual machine system including a physical computer with a virtualization unit providing one or more virtual machines and a management server managing a plurality of the physical computers with a processor and memory, the management server comprising:
a configuration management unit configured to hold a relationship between a virtualization unit and a virtual machine operated on the physical computer;
a resource management unit configured to hold a situation of use of a computer resource of the physical computer;
a control pattern determination unit configured to determine a configuration change of the physical computer and the virtual machine in the event of a predetermined trigger; and
a control unit configured to command the physical computer to make the determined configuration change, wherein
the control pattern determination unit specifies a virtual machine as a migration target based on preset trigger definition information, determines a physical computer of a migration destination based on a preset first control pattern to generate a first plan to migrate the virtual machine as the migration target to the physical computer of the migration destination, transforms the first control pattern to a second control pattern based on the preset transformation definition information, generates a second plan to migrate the virtual machine as the migration target to the physical computer of the migration destination based on the transformed second control pattern, performs arithmetic for an evaluation value of the first plan and an evaluation value of the second plan, respectively, compares the evaluation value of the first plan to the evaluation value of the second plan, and selects one of the evaluation values meeting a predetermined condition as an execution plan, and wherein
the control unit outputs a command to migrate the virtual machine as the migration target to the physical computer based on the selected execution plan.

10. The virtual machine system according to claim 9, wherein
the control pattern determination unit decides whether or not the second plan meets a target state set in the trigger definition information, and abandons the second plan in the case of not meeting the target state.

11. The virtual machine system according to claim 9, wherein
the control pattern determination unit acquires information on a computer resource of the physical computer of the migration destination to decide whether or not the second plan is feasible with the computer resource of the migration destination, and abandons the second plan in the case of not having the computer resource enough.

12. The virtual machine system according to claim 9, wherein
the control pattern determination unit decides, after stopping acceptance of a configuration change request for the physical computer and the virtual machine, a physical computer of a migration destination based on a preset first control pattern to generate a first plan to migrate the virtual machine as the migration target to the physical computer of the migration destination, and wherein
the control unit keeps stoppage of acceptance of a configuration change request for the virtual machine as the migration target and the physical computer and migrates the virtual machine as the migration target based on the selected execution plan, thereafter resuming acceptance of the configuration change request.

13. The virtual machine system according to claim 9, wherein
the virtualization unit includes a first virtualization unit configured to be operated on the physical computer and a second virtualization unit configured to be operated on a first virtual machine operated on the first virtualization unit.

14. The virtual machine system according to claim 9, wherein
the control pattern determination unit performs arithmetic for an index of a time required for executing the first plan and an index of a time required for executing the second plan, respectively, as the evaluation values, and selects, as an execution plan, a smaller evaluation value between the evaluation value of the first plan and the evaluation value of the second plan.

15. The virtual machine system according to claim 9, wherein the control pattern determination unit performs arithmetic for man-hours required for executing the first plan and man-hours required for executing the second plan, respectively, as the evaluation values, and selects, as an execution plan, a smaller evaluation value between the evaluation value of the first plan and the evaluation value of the second plan.

16. The virtual machine system according to claim 9, wherein in the trigger definition information, the types of a target state and an evaluation value corresponding to the type of a trigger are preset.

* * * * *